US012319557B2

(12) United States Patent
Roberts et al.

(10) Patent No.: US 12,319,557 B2
(45) Date of Patent: Jun. 3, 2025

(54) DISPENSING NOZZLE ASSEMBLIES WITH STATIC MIXERS

(71) Applicant: The Coca-Cola Company, Atlanta, GA (US)

(72) Inventors: Jevawn Sebastian Roberts, Tucker, GA (US); Benjamin Campbell Steinhaus, Marietta, GA (US); Joseph Daniel Dennis, Sandy Springs, GA (US)

(73) Assignee: THE COCA-COLA COMPANY, Atlanta, GA (US)

( * ) Notice: Subject to any disclaimer, the term of this patent is extended or adjusted under 35 U.S.C. 154(b) by 552 days.

(21) Appl. No.: 17/415,287

(22) PCT Filed: Dec. 17, 2019

(86) PCT No.: PCT/US2019/066853
§ 371 (c)(1),
(2) Date: Jun. 17, 2021

(87) PCT Pub. No.: WO2020/131873
PCT Pub. Date: Jun. 25, 2020

(65) Prior Publication Data

US 2022/0055883 A1 Feb. 24, 2022

Related U.S. Application Data

(60) Provisional application No. 62/782,601, filed on Dec. 20, 2018.

(51) Int. Cl.
*B67D 1/00* (2006.01)

(52) U.S. Cl.
CPC ......... *B67D 1/0044* (2013.01); *B67D 1/0021* (2013.01)

(58) Field of Classification Search
CPC ... B67D 1/0044; B67D 1/0021; B01F 25/433; B01F 25/4334; B01F 25/431;
(Continued)

(56) References Cited

U.S. PATENT DOCUMENTS

| | | | |
|---|---|---|---|
| 2,537,119 | A | 1/1951 | Bauerlein et al. |
| 2,551,699 | A | 5/1951 | Parks |

(Continued)

FOREIGN PATENT DOCUMENTS

| | | | |
|---|---|---|---|
| EP | 0125465 | A2 | 11/1984 |
| JP | 2015-134642 | A | 7/2015 |

(Continued)

OTHER PUBLICATIONS

International Search Report and Written Opinion, PCT/US2019/066853, Apr. 16, 2020 (8 pp.).

(Continued)

*Primary Examiner* — Christopher R Dandridge
(74) *Attorney, Agent, or Firm* — Eversheds Sutherland (US) LLP

(57) ABSTRACT

The present application provides a dispensing nozzle assembly for mixing a first fluid and a second fluid. The dispensing nozzle assembly may include a target assembly with a number of fins and a number of channels and a static mixer positioned about the fins.

8 Claims, 22 Drawing Sheets

(58) Field of Classification Search
CPC ............ B01F 25/4317; B01F 25/43195; B01F 3/0861; B01F 5/0612; B01F 5/0614; B01F 5/0618
See application file for complete search history.

(56) References Cited

U.S. PATENT DOCUMENTS

| | | | | |
|---|---|---|---|---|
| 3,286,992 | A | 11/1966 | Armeniades et al. | |
| 4,821,925 | A | 4/1989 | Wiley et al. | |
| 5,251,789 | A | 10/1993 | Jeans | |
| 5,415,326 | A | 5/1995 | Durham et al. | |
| 7,383,966 | B2 | 6/2008 | Ziesel | |
| 7,445,133 | B2 | 11/2008 | Ludovissie et al. | |
| 7,578,415 | B2 * | 8/2009 | Ziesel | B67D 1/0085 222/129.1 |
| 7,866,509 | B2 | 1/2011 | Ziesel | |
| 9,016,523 | B2 | 4/2015 | Gates | |
| 9,415,991 | B2 | 8/2016 | Green | |
| 9,656,849 | B2 | 5/2017 | Hawken | |
| 10,071,899 | B2 | 9/2018 | Mastro et al. | |
| 10,472,220 | B2 | 11/2019 | Moore et al. | |
| 10,759,645 | B2 | 9/2020 | Aslam et al. | |
| 2004/0040983 | A1 | 3/2004 | Ziesel | |
| 2006/0097009 | A1 | 5/2006 | Bethuy et al. | |
| 2007/0110872 | A1 | 5/2007 | Gerber | |
| 2008/0140261 | A1 | 6/2008 | Hansen et al. | |
| 2014/0263416 | A1 | 9/2014 | Green | |
| 2014/0361041 | A1 * | 12/2014 | Hawken | B67D 1/0085 222/129.1 |
| 2015/0314006 | A1 | 11/2015 | Cheng et al. | |
| 2016/0009539 | A1 | 1/2016 | Jersey et al. | |
| 2016/0009540 | A1 | 1/2016 | Hecht et al. | |
| 2018/0162710 | A1 | 6/2018 | Moore et al. | |
| 2018/0280900 | A1 | 10/2018 | Tucker | |
| 2018/0311625 | A1 | 11/2018 | Valavala et al. | |
| 2019/0039873 | A1 * | 2/2019 | Aslam | B67D 1/0048 |

FOREIGN PATENT DOCUMENTS

| | | | |
|---|---|---|---|
| KR | 10-2005-0021441 | A | 3/2005 |
| KR | 10-2013-0108242 | A | 10/2013 |

OTHER PUBLICATIONS

Extended Search Report for EP 19900401.1, dated Aug. 8, 2022 (11 pp.).

* cited by examiner

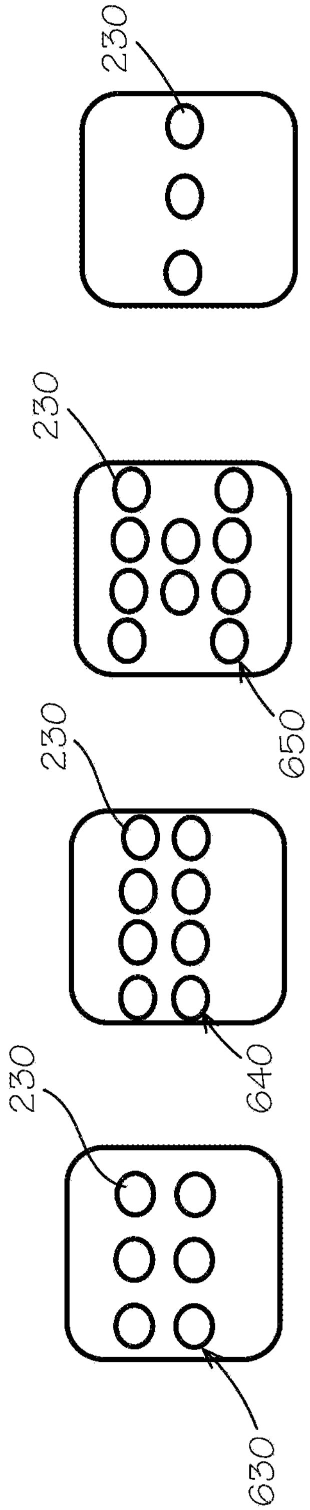
FIG. 22A
FIG. 22B
FIG. 22C
FIG. 22D
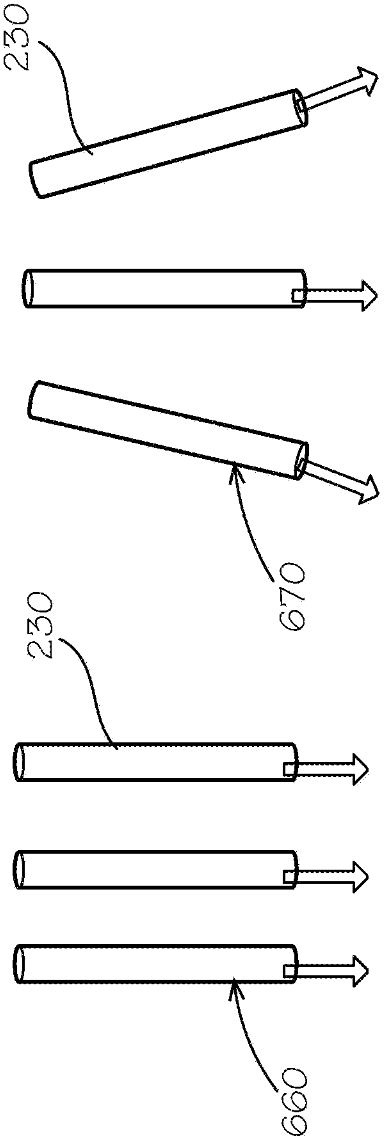
FIG. 23A
FIG. 23B

DISPENSING NOZZLE ASSEMBLIES WITH STATIC MIXERS

TECHNICAL FIELD

The present application and the resultant patent relate generally to dispensing nozzle assemblies for beverage dispensers and more particularly relate to multi-flavor or multi-fluid dispensing nozzle assemblies with a static mixer positioned about a target assembly for improved mixing with reduced carryover between pours.

BACKGROUND OF THE INVENTION

Current post-mix beverage dispensing nozzles generally mix streams of syrup, concentrate, sweetener, bonus flavors, other types of flavoring, and other ingredients with water or other types of diluent by flowing the syrup stream down the center of the nozzle with the water stream flowing around the outside. The syrup stream is directed downward with the water stream such that the streams mix as they fall into a consumer's cup.

There is a desire for a beverage dispensing system as a whole to provide as many different types and flavors of beverages as may be possible in a footprint that may be as small as possible. Preferably, such a beverage dispensing system may provide as many beverages as may be available on the market in prepackaged bottles, cans, or other types of containers.

In order to accommodate this variety, the dispensing nozzles need to accommodate fluids with different viscosities, flow rates, mixing ratios, temperatures, and other variables. Current dispensing nozzle assemblies may not be able to accommodate multiple beverages with a single nozzle design and/or the dispensing nozzle assembly may be designed for specific types of fluid flow. One known means of accommodating differing flow characteristics is shown in commonly owned U.S. Pat. No. 7,383,966 that describes the use of replaceable fluid modules that are sized and shaped for specific flow characteristics. Even more variety and more fluid streams may be employed in commonly owned U.S. Pat. No. 7,578,415 that shows the use of a number of tertiary flow assemblies.

One issue with the use of certain nozzle designs is brix stratification. (One degree Brix is 1 gram of sucrose in 100 grams of solution and represents the strength of the solution as percentage by mass.) Certain thicker or more viscous syrups may resist proper mixing with the other ingredients. As a result, the dispenser may provide an out of specification beverage with higher amounts of sugar at the bottom of the drink and lower amounts at the top.

There is thus a desire for a dispensing nozzle assembly to accommodate even more and different types of fluids that may pass there through. The dispensing nozzle assembly preferably may accommodate this variety while still providing good mixing and easy cleaning.

SUMMARY OF THE INVENTION

The present application and the resultant patent thus provide a dispensing nozzle assembly for mixing a first fluid and a second fluid. The dispensing nozzle assembly may include a target assembly with a number of fins and a number of channels and a static mixer positioned about the fins.

The present application and the resultant patent further provide a dispensing nozzle assembly for mixing a first fluid and a second fluid. The dispensing nozzle assembly may include a target assembly with a number of target fins and a number of target channels and a twisted static mixer positioned about the target fins. The twisted static mixer may include a number of twisted mixing fins.

These and other features and improvements of the present application and the resultant patent will become apparent to one of ordinary skill in the art upon review of the following detailed description when taken in conjunction with the several drawings and the appended claims.

BRIEF DESCRIPTION OF THE DRAWINGS

FIGS. 22A-22D show alternative configurations of macro-ingredient tubes as may be described herein.

FIGS. 23A-23B show alternative configurations of macro-ingredient tubes as may be described herein.

DETAILED DESCRIPTION

Figure 1:
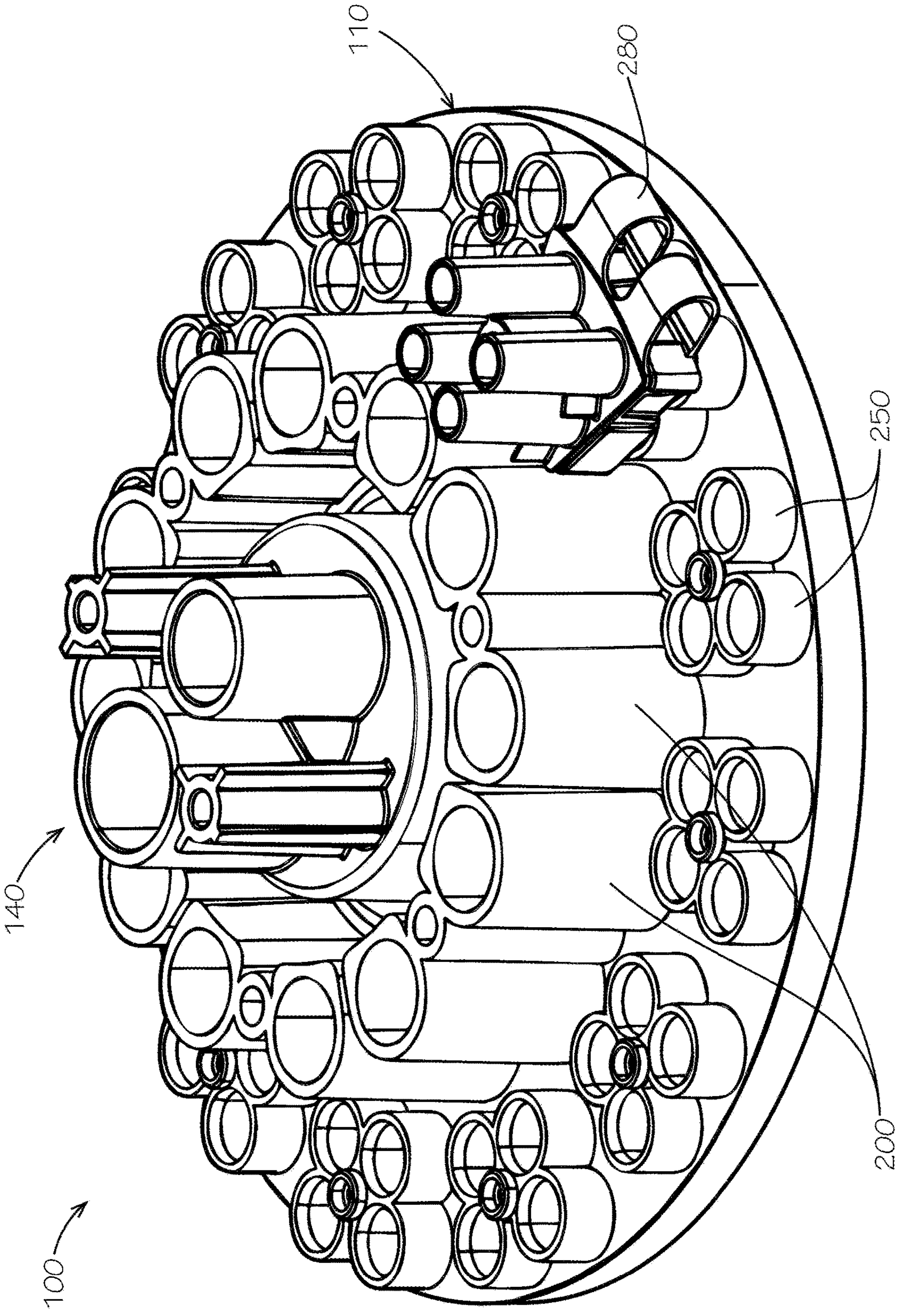
FIG. 1 is a perspective view of a dispensing nozzle assembly as described herein.
Figure 2:
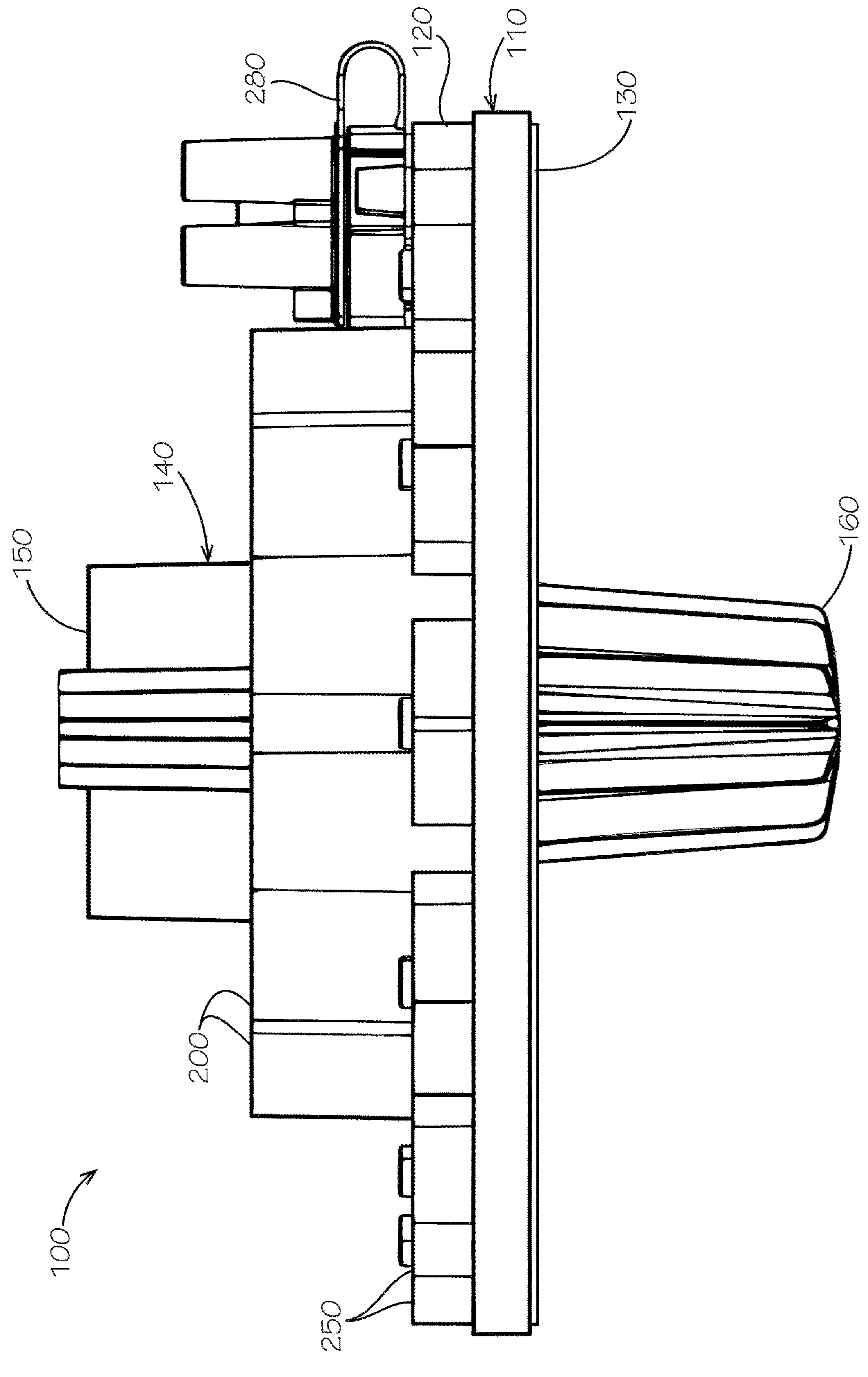
FIG. 2 is a side plan view of the dispensing nozzle assembly of FIG. 1.
Figure 3:
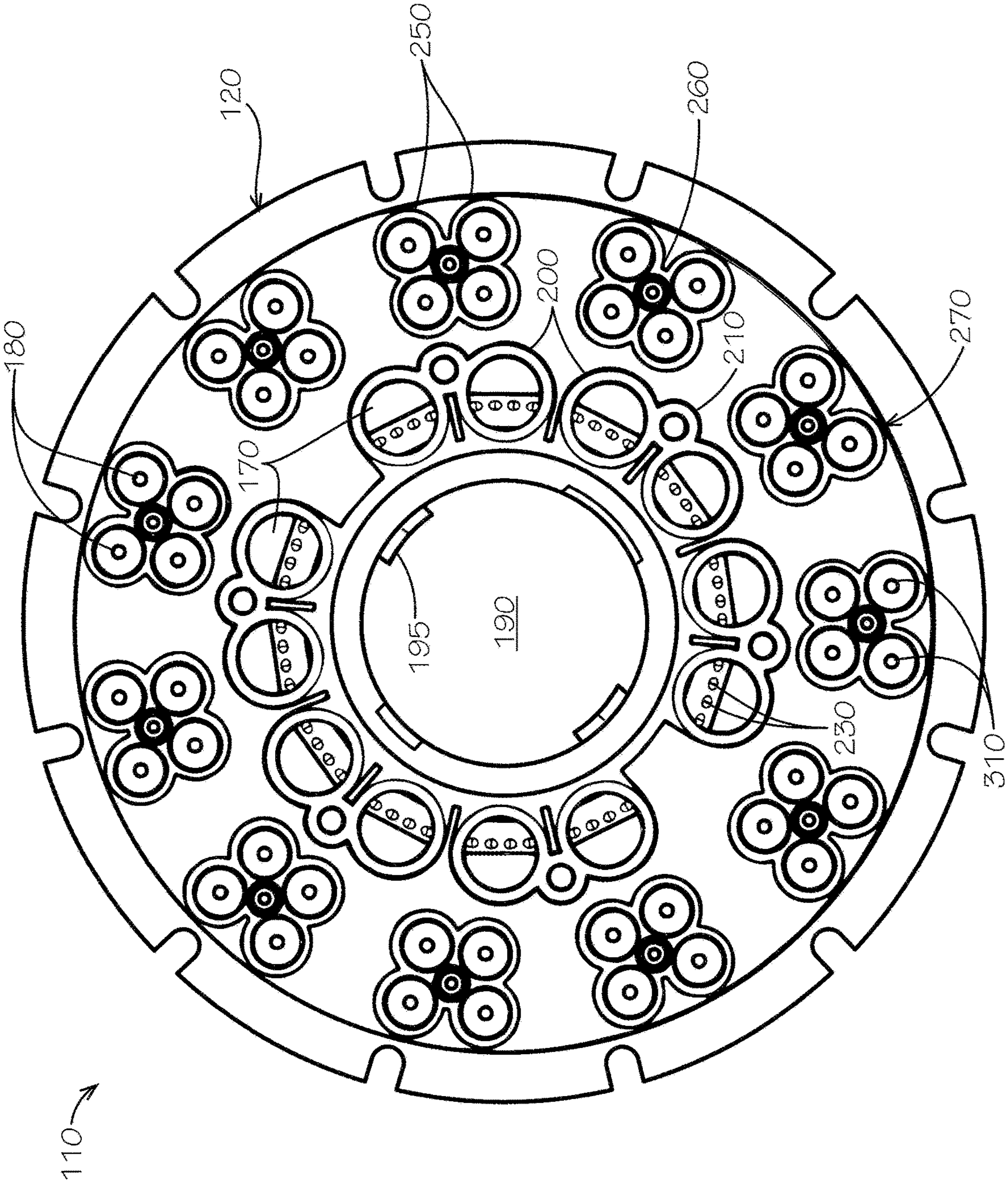
FIG. 3 is a top plan view of the injection ring assembly of the dispensing nozzle of FIG. 1.

Referring now to the drawings, in which like numerals refer to like elements throughout the several views, FIG. 1 shows an example of a dispensing nozzle assembly 100 as is described herein. The dispensing nozzle assembly 100 may be used as part of a beverage dispenser for dispensing many different types of beverages or other types of fluids. Specifically, the dispensing nozzle assembly 100 may be used with diluents, macro-ingredients, micro-ingredients, and other types of fluids. The diluents generally include plain water (still water or non-carbonated water), carbonated water, and other fluids. The dispensing nozzle assembly 100 may be a common dispensing nozzle assembly. The term "common" is used herein to signify that the common dispensing nozzle assembly may be commonly used with many different types of beverages and beverage dispensers.

Generally described, the macro-ingredients may have reconstitution ratios in the range from full strength (no dilution) to about six (6) to one (1) (but generally less than about ten (10) to one (1)). The macro-ingredients may include sugar syrup, HFCS ("High Fructose Corn Syrup"), FIS ("Fully Inverted Sugar"), MIS ("Medium Inverted Sugar"), concentrated extracts, purees, and similar types of ingredients. Other ingredients may include traditional BIB ("Bag-in-box") flavored syrups, nutritive and non-nutritive sweetener blends, juice concentrates, dairy products, soy, and rice concentrates. Similarly, a macro-ingredient base product may include the sweetener as well as flavorings, acids, and other common components of a beverage syrup. The beverage syrup with sugar, HFCS, or other macro-ingredient base products generally may be stored in a conventional bag-in-box container remote from the dispenser. The viscosity of the macro-ingredients may range from about 1 to about 10,000 centipoise and generally over 100 centipoises or so when chilled. Other types of macro-ingredients may be used herein.

The micro-ingredients may have reconstitution ratios ranging from about ten (10) to one (1) and higher. Specifically, many micro-ingredients may have reconstitution ratios in the range of about 20:1, to 50:1, to 100:1, to 300:1, or higher. The viscosities of the micro-ingredients typically range from about one (1) to about six (6) centipoise or so, but may vary from this range. Examples of micro-ingredients include natural or artificial flavors; flavor additives; natural or artificial colors; artificial sweeteners (high potency, nonnutritive, or otherwise); antifoam agents, non-nutritive ingredients, additives for controlling tartness, e.g., citric acid or potassium citrate; functional additives such as vitamins, minerals, herbal extracts, nutricuticals; and over the counter (or otherwise) medicines such as pseudoephedrine, acetaminophen; and similar types of ingredients. Various types of alcohols may be used as either macro- or micro-ingredients. The micro-ingredients may be in liquid, gaseous, or powder form (and/or combinations thereof including soluble and suspended ingredients in a variety of media, including water, organic solvents, and oils). Other types of micro-ingredients may be used herein.

The dispensing nozzle assembly 100 may be largely modular in nature. The dispensing nozzle assembly 100 may include an injector ring assembly 110. The injector ring assembly 110 may include an upper injector ring 120 and a lower injector ring 130. The respective injector rings 120, 130 may be made out of a thermoplastic such as polypropylene and the like. Other types of food grade materials may be used herein. The injector rings 120, 130 may be injection molded or manufactured via other types of conventional techniques. The injector rings 120, 130 may be fastened together via laser welding techniques. The use of laser welding avoids the need for gaskets and the like. Other types of fastening techniques may be used herein.

The dispensing nozzle assembly 100 also may have a core module assembly 140. The core module assembly 140 may include a diluent/sweetener module 150 and a target assembly 160. The diluent/sweetener module 150 and the target assembly 160 also may be made out of a food grade thermoplastic such as polypropylene and the like. Other types of food grade materials may be used herein. The diluent/sweetener module 150 and the target assembly 160 may be injection molded or manufactured via other types of conventional techniques. The diluent/sweetener module 150 and the target assembly 160 may be in communication with the upper and lower injector rings 120, 130 of the injector ring assembly 110 as will be described in more detail below. In some embodiments, the diluent/sweetener module 150 may be fastened with the upper injector ring 120 such as via laser welding or other types of fastening techniques. Other components and other configurations may be used herein.

The injector ring assembly 110 may define a number of macro-ingredient paths 170 and a number of micro-ingredient paths 180 therethrough. FIGS. 3-6 show an example of the injector ring assembly 110. The injector ring assembly 110 may be largely plate like in shape with a central aperture 190 extending therethrough. The lower injector ring 130 may be largely flat and planar like in shape. The upper injector ring 120 may have the macro-ingredient paths 170 and the micro-ingredient paths 180 extending therethrough. The central aperture 190 may be sized and shaped for the diluent/sweetener module 150 and the target assembly 160. One or more assembly flanges 195 may extend into the central aperture 190. Other components and other configurations may be used herein.

Specifically, the upper injector ring 120 may include a number of macro-ingredient ports 200 of the macro-ingredient paths 170. In this example, there may be twelve (12) macro-ingredient ports 200 encircling about the central aperture 190 in whole or in part. Any number of the macro-ingredient ports 200 may be used herein in any position. The macro-ingredient ports 200 may be arranged in pairs with each pair sharing a macro-ingredient line fastener aperture 210. The macro-ingredient line fastener aperture 210 allows a macro-ingredient line to be secured thereto. The macro-ingredient ports 200 may be used and sized primarily for traditional beverage syrups that are typically housed in a bag-in-box container as described above although any type of macro-ingredient may be used herein.

Each macro-ingredient port 200 may include a macro-ingredient inlet chamber 220. The macro-ingredient inlet chamber 220 may be largely tube-like in shape. Each macro-ingredient inlet chamber 220 may lead to a number of macro-ingredient outlet tubes 230. In this example, each macro-ingredient inlet chamber 220 extends to four (4)

macro-ingredient outlet tubes 230. Any number of the macro-ingredient outlet tubes 230 may be used herein in communication with each macro-ingredient inlet chamber 220. The number of macro-ingredient outlet tubes 230 may vary in each macro-ingredient inlet chamber 220. The macro-ingredient outlet tubes 230 may have an angled configuration 240. Specifically, the macro-ingredient outlet tubes 230 may extend in the angled configuration 240 through the upper injector ring 120 to the central aperture 190 towards the target assembly 160. The angle may be about 40 to about 50 degrees although the angle may vary. The macro-ingredient outlet chambers 220 and the macro-ingredient outlet tubes 230 may have any suitable size, shape, or configuration. Other components and other configurations may be used herein.

The upper injector ring 120 also may include a number of micro-ingredient ports 250 of the micro-ingredient paths 180. The micro ingredient ports 250 may be used and sized primarily for use with the micro-ingredients. In this example, eleven (11) sets of four (4) micro-ingredient ports 250 are shown encircling the center aperture 190 concentrically with the macro-ingredient ports 200. Any number of the micro-ingredient ports 250 may be used herein in any configuration. Each set of the micro-ingredient ports 250 may have one or more micro-ingredient line fastener apertures 260 positioned there about. The micro-ingredient line fastener apertures 260 allow a micro-ingredient line to be secured thereto. The micro-ingredient ports 250 may be arranged in a quad configuration 270 of a set of four ports. The quad configuration 270 may accommodate a quad tube assembly 280 as shown in part in FIG. 1 and shown in U.S. Pat. No. 7,866,509 referenced above. Other components and other configurations may be used herein.

Each micro-ingredient port 250 may include a micro-ingredient inlet passage 290. The micro-ingredient inlet passages 290 may be largely tube-like in shape. The micro-ingredient inlet passages 290 may have any suitable size, shape, or configuration. Each micro-ingredient inlet passage 290 may lead to a micro-ingredient dispensing chamber 300. The micro-ingredient inlet passages 290 may be in communication with the micro-ingredient dispensing chambers 300 via a micro-ingredient dispensing chamber inlet tube 310. The micro-ingredient dispensing chamber inlet tube 310 may have a reduced diameter as compared to the micro-ingredient inlet passage 290. Each micro-ingredient dispensing chamber 300 may have a curved configuration 320 along the horizontal plane such that the upper injector ring 120 may accommodate as many micro-ingredient ports 250 as possible extending therethrough. Each micro-ingredient dispensing chamber 300 may be enclosed on the lower side by the lower injector ring 130. Each micro-ingredient dispensing chamber 300 may include a micro-ingredient dispensing chamber outlet tube 330. Each of the micro-ingredient dispensing chamber outlet tubes 330 may include the angled configuration 240. Specifically, the micro-ingredient dispensing chamber outlet tube 330 may extend in the angled configuration 240 from the micro-ingredient dispensing chamber 300 through the upper ring 120 and into the central aperture 190. The same or different angles may be used herein. The micro-ingredient dispensing chamber outlet tubes 330 may have a reduced diameter as compared to the micro-ingredient dispensing chamber inlet tubes 310. The micro-ingredient dispensing chamber outlet tubes 330 may extend below the macro-ingredient outlet tubes 230 along the angled configuration 240 in whole or in part. The micro-ingredient inlet passage 290, the micro-ingredient dispensing chamber inlet tubes 310, the micro-ingredient dispensing chamber 300, and the micro-ingredient dispensing chamber outlet tubes 330 may have any suitable size, shape, or configuration. Other components and other configurations may be used herein.

The macro-ingredient outlet tubes 230 and the micro-ingredient dispensing chamber outlet tubes 330 may extend through a dispensing ring 340 of the upper injector ring 120. The dispensing ring 340 may be a molded, unitary element of the upper injector ring 120 or the dispensing ring 340 may be a separate, added component. If a separate component, the dispensing ring 340 may be modular in nature and may be divided into any number of pie shaped elements or otherwise configured. The dispensing ring 340 may be made out of a thermoplastic like the rest of the upper injector ring 120 or a different material such as stainless steel or a ceramic. The macro-ingredient outlet tubes 230 and/or the micro-ingredient dispensing chamber outlet tubes 330 may be laser drilled through the dispensing ring 340. Other types of drilling techniques may be used herein. The use of a hydrophilic material such as stainless steel may prevent or limit fluid carryover, i.e., micro-ingredients may pool at the end of the micro-ingredient dispensing chamber outlet tube 330. Such pooled micro-ingredients may drip and/or carry over into the next beverage. The use of the angled configuration 240 also may assist in reducing carryover. Other components and other configurations may be used herein.

FIGS. 7-10 show an example of the core module assembly 140 with the diluent/sweetener module 150 and the target assembly 160. The diluent/sweetener module 150 may be attached to the target assembly 160 in a snap fit and the like. The diluent/sweetener module 150 may include a diluent port 350 and a sweetener port 360. The diluent/sweetener module 150 may include a diluent/sweetener module fastener aperture 370 extend therefrom. A diluent line and a sweetener line may be attached thereto. The target assembly 160 may include a number of vertically extending fins 380 that extend into a largely star-shaped appearance as viewed from the bottom. The fins 380 may form a number of U or V shaped channels 390.

When combined, the diluent/sweetener module 150 and the target assembly 160 may define a diluent/sweetener mixing chamber 400 therebetween. The target assembly 160 may have a number of diluent/sweetener dispensing ports 410 positioned about the diluent/sweetener mixing chamber 400. Specifically, the diluent/sweetener mixing chamber 400 may extend from the diluent port 350 and the sweetener port 360 to the diluent/sweetener dispensing ports 410. The dispensing ports 410 may be positioned over the fins 380 and the channels 390 of the target assembly 160. An umbrella valve 415 and the like also may be used herein.

The target assembly 160 may include an assembly track 420 formed thereon. The assembly track 420 may include a lower path 430 and an upper path 440. The assembly track 420 may be sized to accommodate the assembly flange 195 of the central aperture 190 of the injection ring assembly 110 so as to connect the core module assembly 140 to the injector ring assembly 110 (or vice versa). The assembly track 420 may have any suitable size, shape, or configuration. Other components and other configurations may be used herein.

In use, the upper injection ring 120 and the lower injection ring 130 may be combined so as to form the injector ring assembly 110. Likewise, the diluent/sweetener module 150 and the target assembly 160 may be combined so as to form the core module assembly 140. The core module assembly 140 may be positioned within the central aperture 190 of the injector ring assembly 110. The assembly track 420 of the core module assembly 140 may accommodate the assembly flange 195 of the injector ring assembly 110 so as to attach the core module assembly 140 in a screw-like action. Specifically, the assembly flange 195 may travel down the upper path 440 as the target assembly 160 is rotated clockwise. Continued rotation pulls the target assembly 160 into a secure fit as the assembly flange 195 travels along the lower path 430. The use of the assembly track 420 also provides for easy removal of the core module assembly 140 for cleaning the central aperture 190 of the injector ring assembly 110. Any order of assembly may be used herein. Any type of fasteners or joinders techniques also may be used herein. Other components and other configurations may be used herein.

A sweetener or other fluid may flow into the sweetener port 360 of the core module assembly 140 with a diluent flowing into the diluent port 350. The sweetener and the surrounding flow of diluent may mix in the diluent/sweetener mixing chamber in whole or in part and may be dispensed via the dispensing ports 410 of the target assembly 160. The diluent/sweetener mixture may flow downward through the channels 390 of the target assembly 160 and continue mixing therealong.

One or more macro-ingredients may flow into the macro-ingredient ports 200 of the upper injector ring 120 of the injector ring assembly 110. The macro-ingredients may flow through the macro-ingredient inlet chambers 220 and may be dispensed via the macro-ingredient outlet tubes 230 with the angled configuration 240 towards the target assembly 160. Having a number of the macro-ingredient outlet tubes 230 used in combination with each of the macro-ingredient inlet chambers 220 allows for good flow of the macro-ingredients therethrough.

Likewise, micro-ingredients may flow into the micro-ingredient ports 250 of the upper injector ring 120 of the injector ring assembly 110. The micro-ingredients may flow into the micro-ingredient passage 290 and into the micro-ingredient dispensing chamber 300 via the micro-ingredient dispensing chamber inlet tube 310. The micro-ingredients may pass through the micro-ingredient dispensing chamber 300 and may exit via the micro-ingredient dispensing chamber outlet tube 330 at the angled configuration 240 towards the targeted assembly 160. The diluent, the sweetener, the macro-ingredients, and/or the micro-ingredients all may mix as they flow along the target assembly 160 and fall towards a consumer's cup or other type of vessel. Different beverages may use different combinations of ingredients.

The common dispensing nozzle assembly 100 thus may be used to dispense any number of beverages. For example, a carbonated soft drink may include a flow of carbonated water as a diluent via the diluent port 350 and a flow of a conventional beverage syrup via one of the macro-ingredient ports 200. Alternatively, the carbonated soft drink also may include the flow of carbonated water via the diluent port 350, a flow of sweetener via the sweetener port 360, and a number of flows of micro-ingredients via the micro-ingredient ports 250. Further, a tea or coffee beverage may be created via a flow of still water as the diluent, a flow of tea concentrate as a macro-ingredient or a micro-ingredient, and a flow of a sweetener as a macro-ingredient or a micro-ingredient. Any number and combination of different beverages may be produced herein in a fast and efficient manner.

The dispensing nozzle assembly 100 may dispense syrups/concentrates with reconstitution ratios of anywhere from about three (3) to one (1) to about one hundred fifty (150) to one (1) or higher. The number, size, and shape of the various ports and pathways herein may be varied and reconfigured as desired. The dispensing nozzle assembly 100 thus may be used with almost any type of beverage dispenser. For example, the dispensing nozzle assembly 100 may be used with a conventional syrup based dispenser, a micro-ingredient based dispenser, and/or a hybrid or other type of dispenser based upon availability or any type of operational parameters or needs. The dispensing nozzle assembly 100 may be original equipment or part of a retrofit. Multiple dispensing nozzles assemblies 100 may be used together herein in different configurations.

The following chart shows how the dispensing nozzle assembly 100 may produce different types of beverages:

| Beverage | Diluent 350 | Sweetener 360 | Macro 230 | Micro 330 |
|---|---|---|---|---|
| Nutritive sweetened Micro-based | On | On | Off | 2+ On |
| Non-nutritive Sweetened Micro-based | On | Off | Off | 2+ On |
| Macro-Based | On | Off | One On | Off |
| Flavored Macro-Based | On | Off | One On | 1+ On |
| Mid-calorie Micro-based | On | On | Off | 3+ On |

Figure 11:
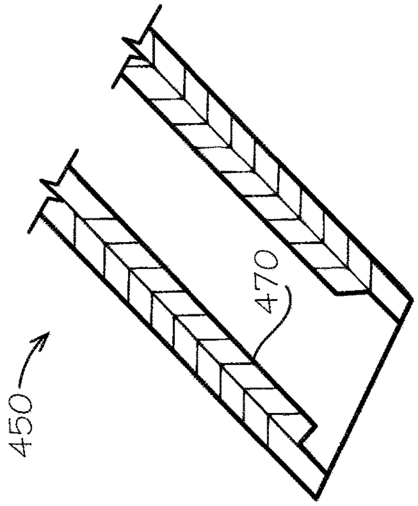
FIG. 11 is a partial section view of an alternative embodiment of an outlet tube as may be described herein.

FIG. 11 shows an alternative embodiment of a micro-ingredient dispensing chamber outlet tube 450. The micro-ingredient dispensing chamber outlet tube 450 may have the angled configuration 240 extending through the dispensing ring 340. The micro-ingredient dispensing chamber outlet tube 450 may include an insert 460 therein. The insert 460 may be made out of a stainless steel, a ceramic, or other types of a hydrophilic material in whole or in part. As described above, the micro-ingredient dispensing chamber outlet tubes 450 may be laser drilled through a plastic material of the dispensing ring 340 or otherwise formed therein. The plastic material may be largely hydrophobic. By using different materials and positions therein, the hydrophilic/hydrophobic ratio of the micro-ingredient dispensing chamber outlet tubes 450 may be varied. Specifically, the hydrophilic material tends to hold the micro-ingredients within the micro-ingredient dispensing chamber outlet tube 450 so as to resist carryover between dispenses. The insert 460 thus may not extend the entire length of the micro-ingredient dispensing chamber outlet tube 450. Rather, a length of the plastic material may extend at the exit. Other components and other configurations may be used herein.

Figure 12:
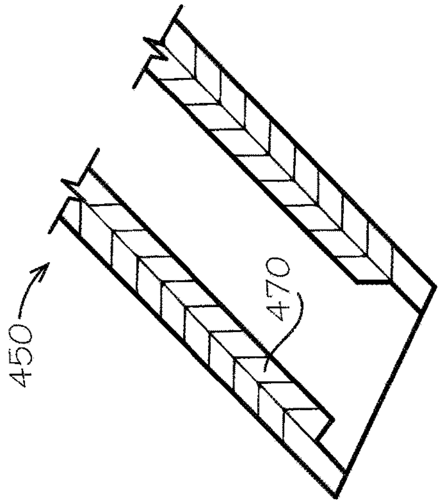
FIG. 12 is a partial section view of an alternative embodiment of an outlet tube as may be described herein.

Alternatively as shown in FIG. 12, the micro-ingredient dispensing chamber outlet tube 450 may include a surface treatment 470 therein. The surface treatment 470 also may vary hydrophilic properties of the micro-ingredient dispensing chamber outlet tubes 450 in whole or in part. As above, the surface treatment 470 may end before the exit of the micro-ingredient dispensing chamber outlet tube 450 given the hydrophobic properties of the plastic.

To the extent that the dispensing ring 340 is made out of stainless steel or similar types of material, each micro-ingredient dispensing chamber outlet tube 450 may take the form of any number of smaller tubes drilled therethrough. The tubes may have the same or a number of different shapes. The use of a number of smaller holes may fan out the velocity of the micro-ingredient stream so as to slow the stream while creating additional surface tension to prevent dripping. The use of the insert 460, the surface treatment 470, and the angled configuration 240 all may contribute to reduce dripping and carryover. The insert 460, the surface treatment 470, and the angled configuration 240 may be used separately or in combination. Other components and other configurations may be used herein.

Figure 13:
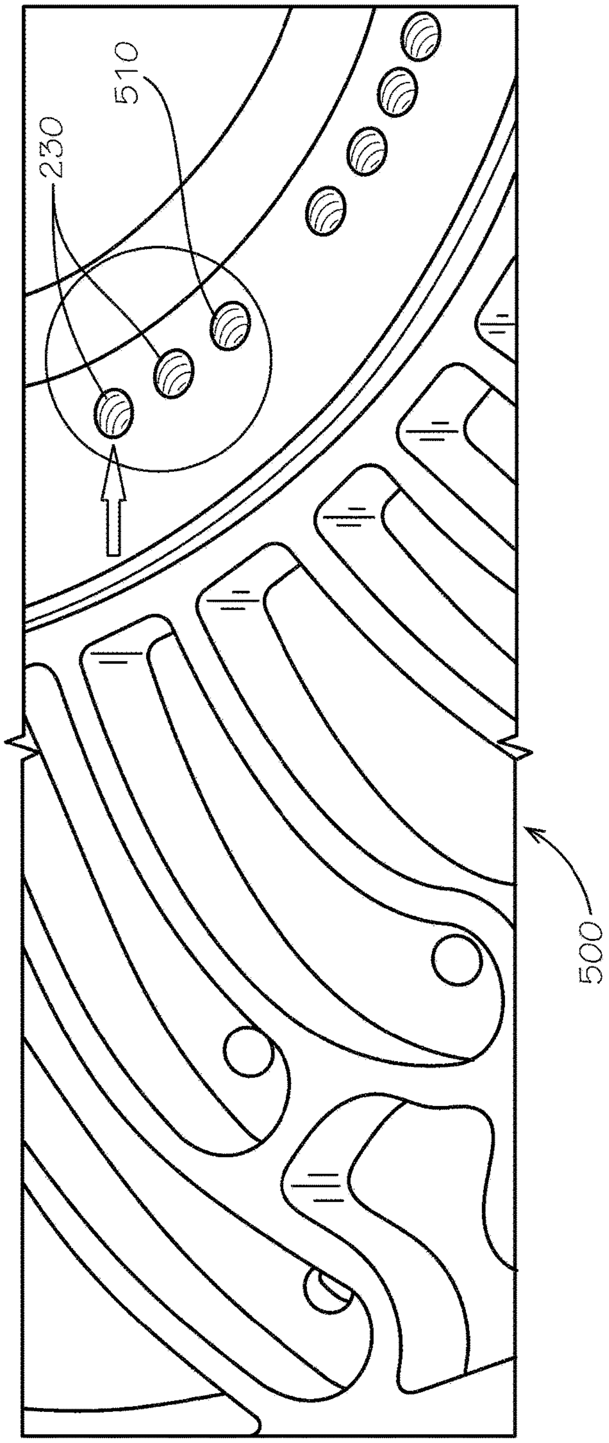
FIG. 13 is a partial bottom perspective view of an alternative embodiment of an upper injector ring of an injector ring assembly as may be described herein.
Figure 14:
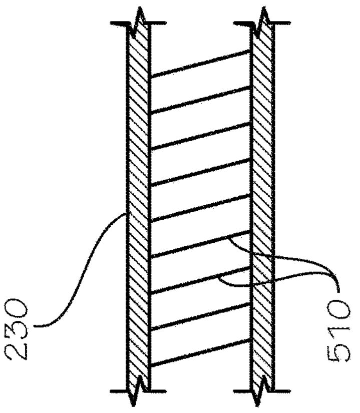
FIG. 14 is partial sectional view of a macro-ingredient outlet tube of the injector ring of FIG. 13.

FIGS. 13 and 14 show an alternative embodiment of an upper injector ring 500 as may be described herein. In this example, the macro-ingredient outlet tubes 230 may include a number of threads 510 formed therein. The size, shape, angle, and configuration of the threads 510 may vary. The threads 510 act somewhat like rifling in a gun barrel to increase the speed of the flow therein. Specifically, the threads 510 are surface instabilities that add a rotational component to the macro-ingredient flow therethrough. This unstable rotation allows the macro-ingredients to mix more easily with the other ingredients so as to reduce thereby brix stratification in the beverage. Other components and other configurations may be used herein.

Figure 15:
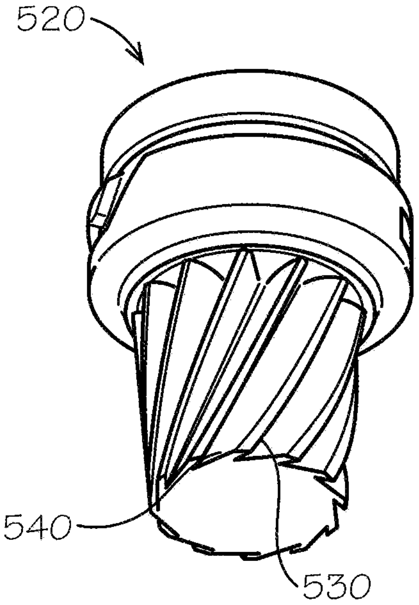
FIG. 15 is a perspective view of an alternative embodiment of a target assembly as may be described herein.
Figure 16:
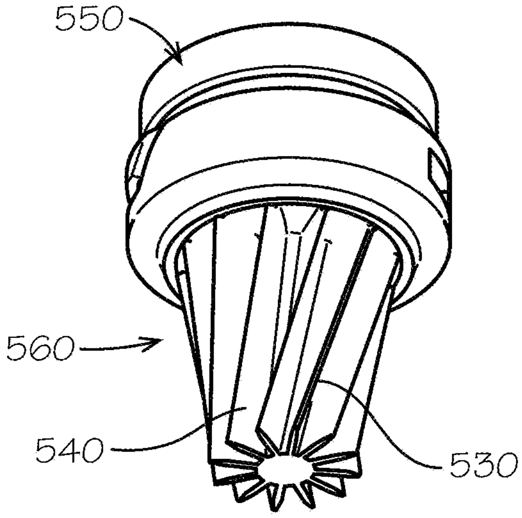
FIG. 16 is a perspective view of an alternative embodiment of a target assembly as may be described herein.
Figure 17:
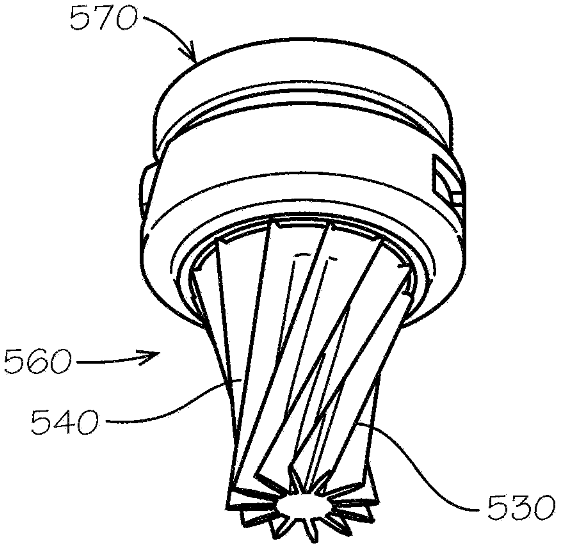
FIG. 17 is a perspective view of an alternative embodiment of a target assembly as may be described herein.

FIGS. 15-17 show further embodiments of a target assembly 160 as may be described herein. FIG. 15 shows a target assembly 520 with a number of twisted fins 530 and twisted channels 540 instead of the straight fins 380 and straight channels 390 shown above. In this example, the twist may be about twenty degrees or so. Other angles may be used herein. In a manner similar to the rifling in the macro-ingredient outlet tubes 230, the twisted fins 530 and the twisted channels 540 create instability and swirl at the end of the target assembly 520 to promote good mixing of the macro-ingredients and the other ingredients and, hence, reduced brix stratification. The target assembly 520 may be used with or without the threads 510 of the macro-ingredient outlet tubes 230. Other components and other configurations may be used herein.

FIG. 16 shows a target assembly 550 using the twisted fins 530 and the twisted channels 540 at about the twenty degree twist. In this example, the twisted fins 530 and the twisted channels 540 may include a taper 560. Specifically, the taper 560 represents a reduction in diameter from the top to the bottom of the target assembly 550. The nature of the taper 560 may vary. FIG. 17 shows a target assembly 570 using the twisted fins 530 and the twisted channels 540 with the taper 560. In this example, the twist may be about forty degrees or so. The angle may range from about fifteen degrees to about forty-five degrees. Other angles may be used herein. Other variations may include changing the length of the fins and the channels. Other components and other configurations may be used herein.

Experimentation has shown that the combination of the treads 510 in the macro-ingredient outlet ports 230 and the twisted fins 530 and twisted channels 540 with the twenty degree twist of the target assembly 520 may have the greatest impact to date on reducing brix stratification in macro-ingredients such a certain types of viscous syrups. Extensive laboratory testing has shown such improved mixing The amount of brix stratification may vary. Such a reduction may bring the resultant beverage into specification such that the flexibility of the overall beverage dispenser is improved.

Figure 4:
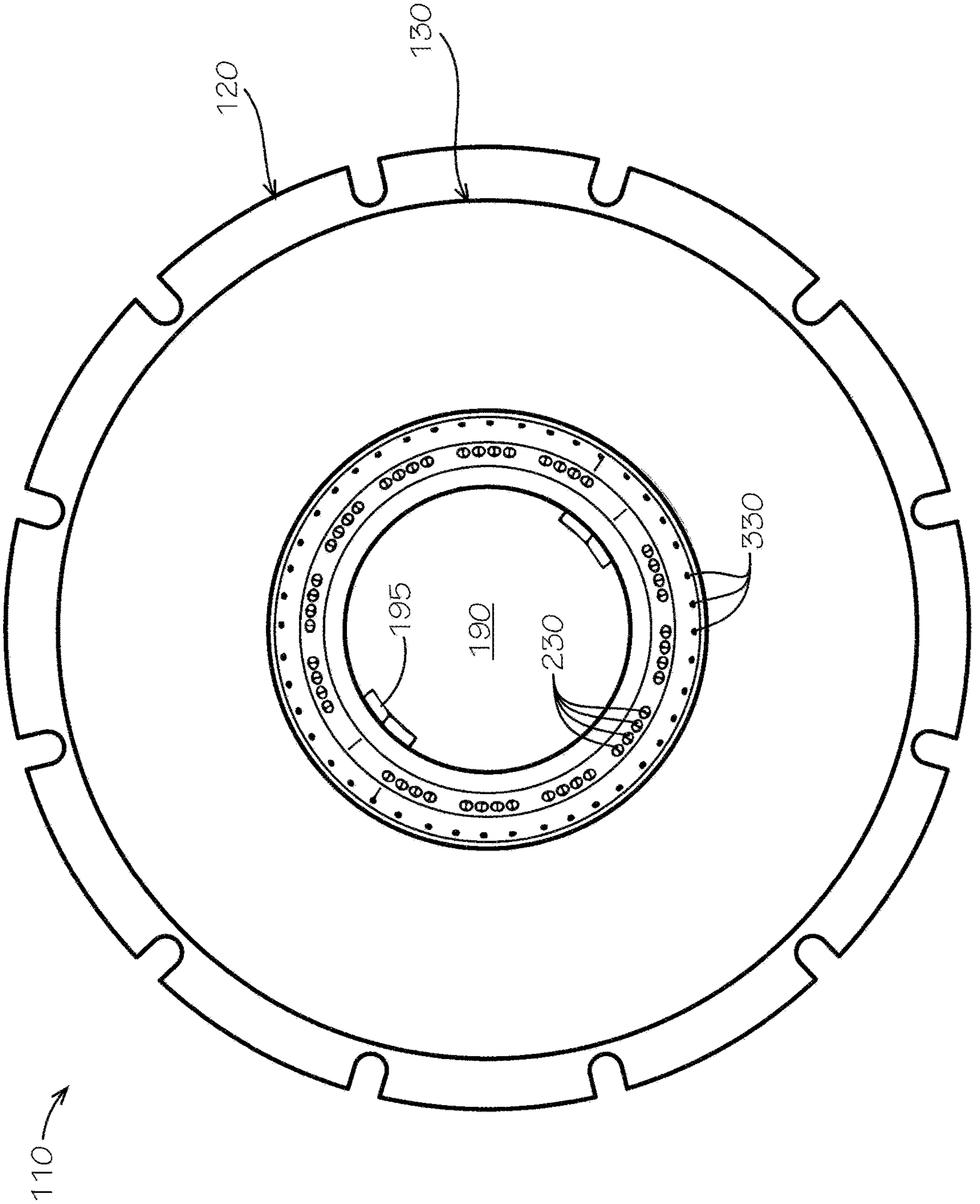
FIG. 4 is a bottom plan view of the injector ring assembly of the dispensing nozzle assembly of FIG. 1.
Figure 5:
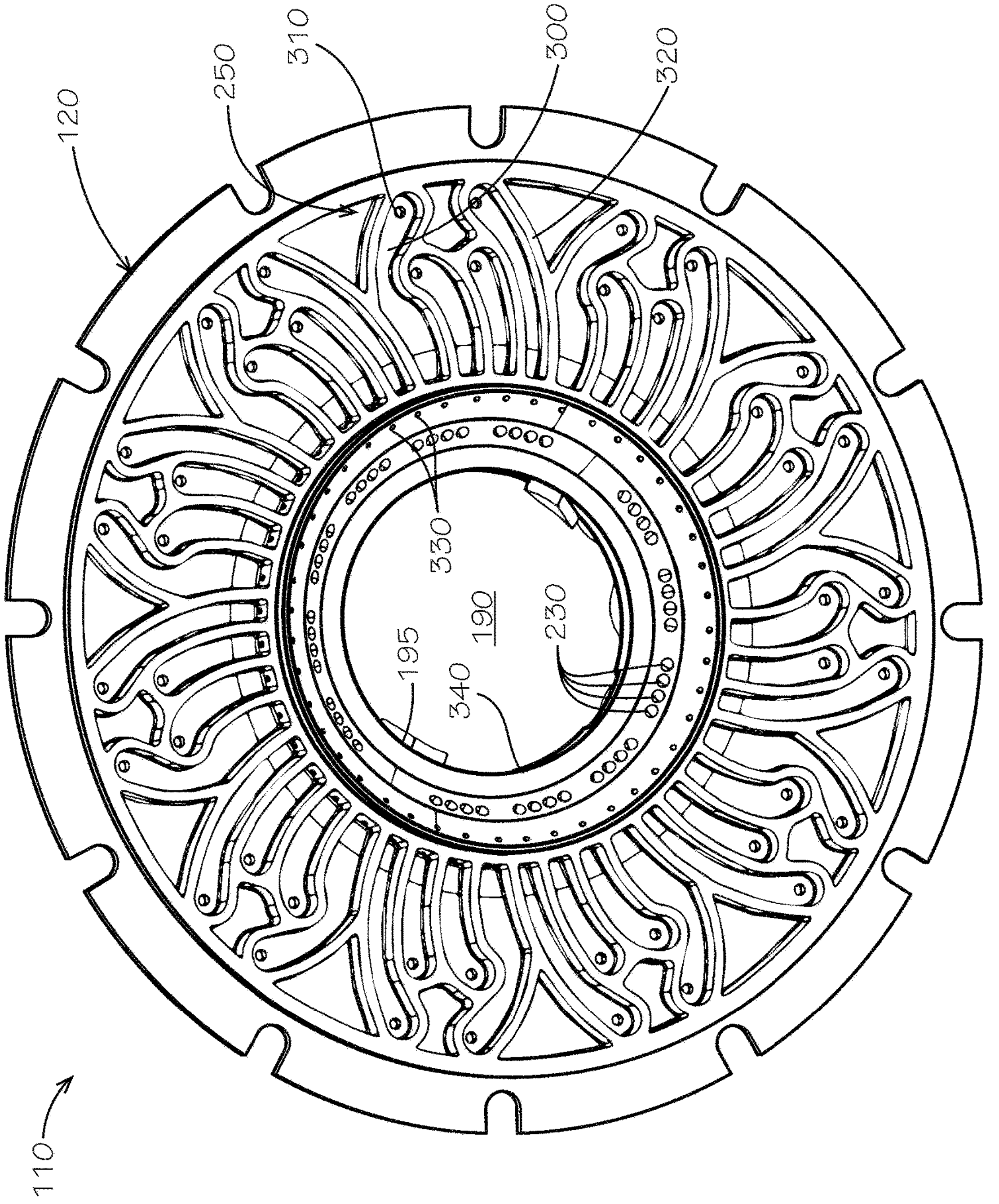
FIG. 5 is a bottom perspective view of an upper injector ring of the injector ring assembly of FIG. 3.
Figure 6:
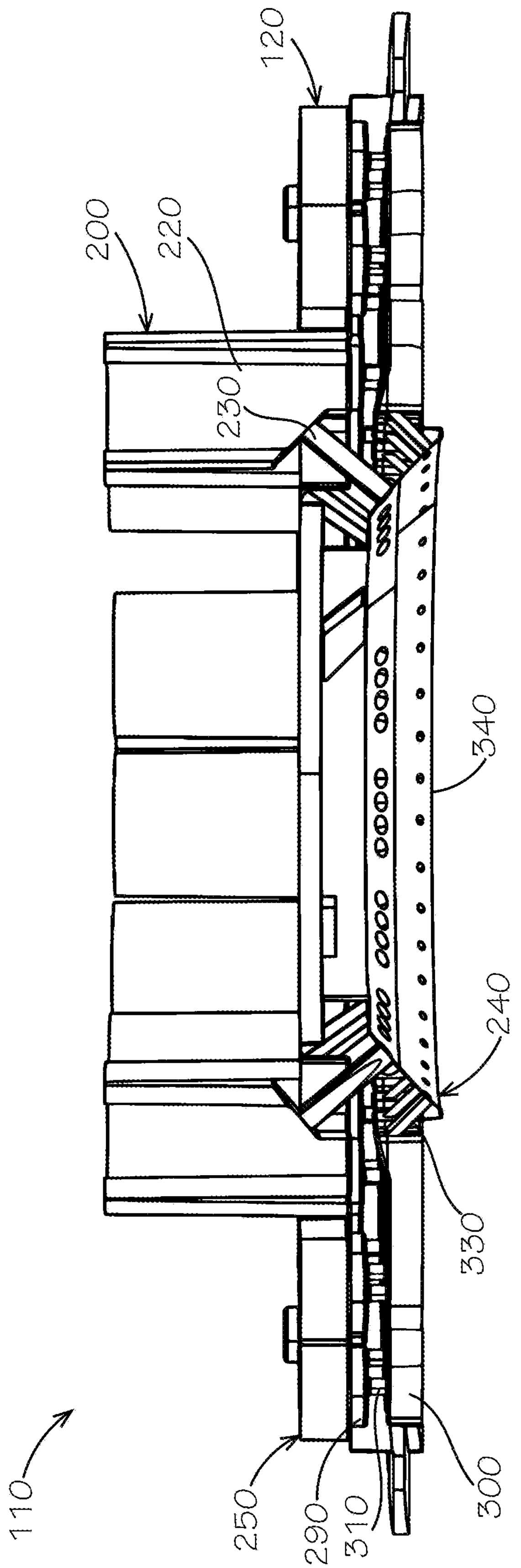
FIG. 6 is a partial sectional view of the upper injector ring of FIG. 5.
Figure 9:
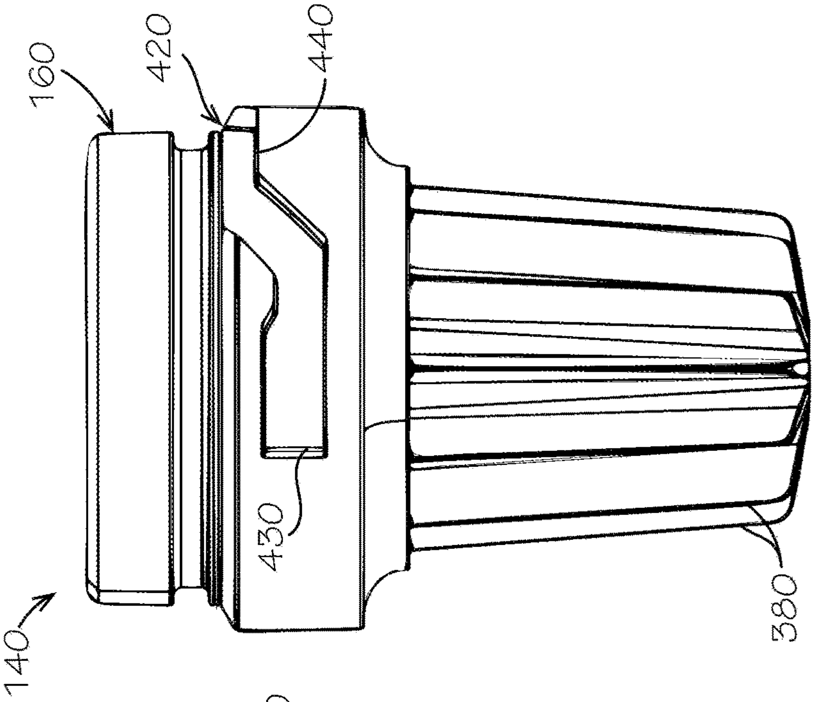
FIG. 9 is a side plan view of the core module assembly of FIG. 7.
Figure 8:
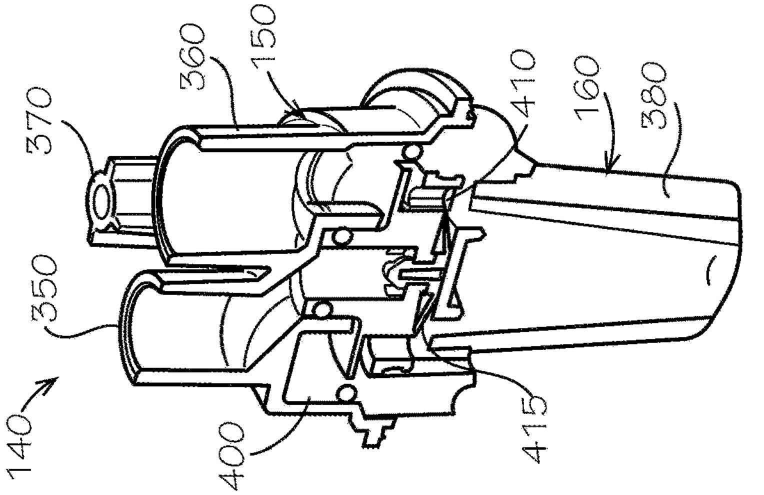
FIG. 8 is a partial sectional view of the core module assembly of FIG. 7.
Figure 7:
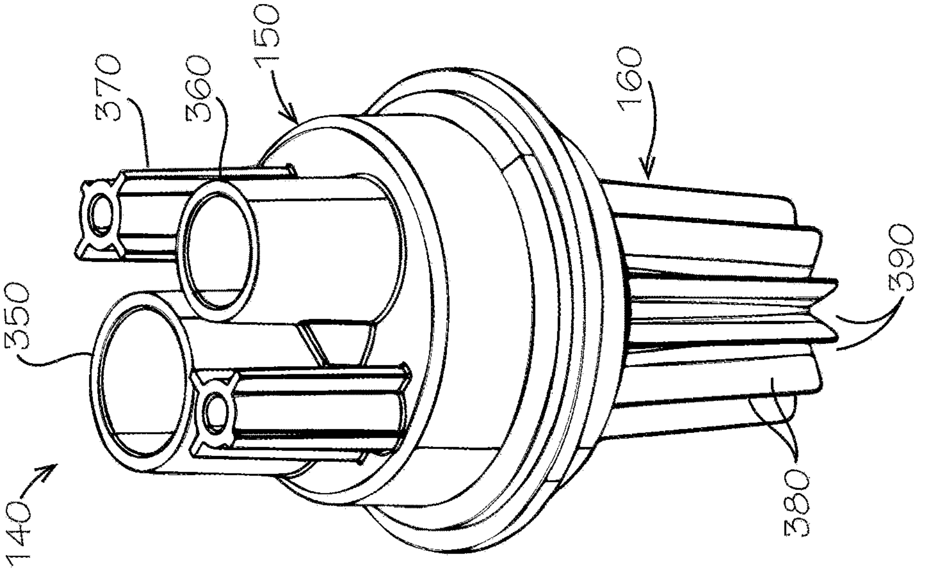
FIG. 7 is a perspective view of a core module assembly of the dispensing nozzle assembly of FIG. 1.
Figure 10:
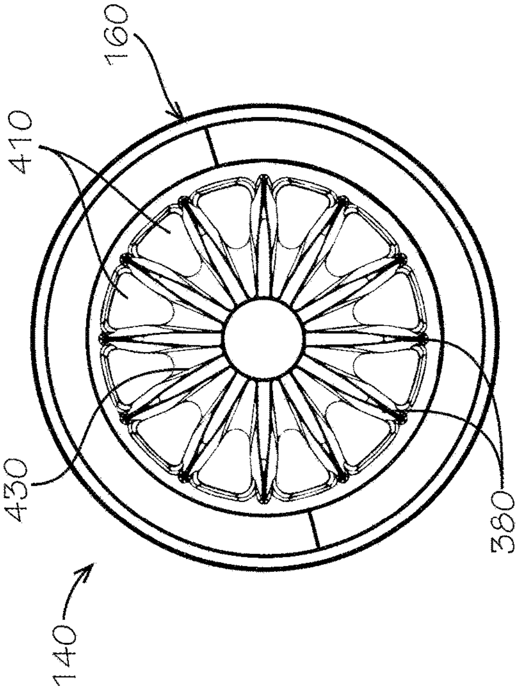
FIG. 10 is a bottom plan view of the core module assembly of FIG. 7.
Figure 18:
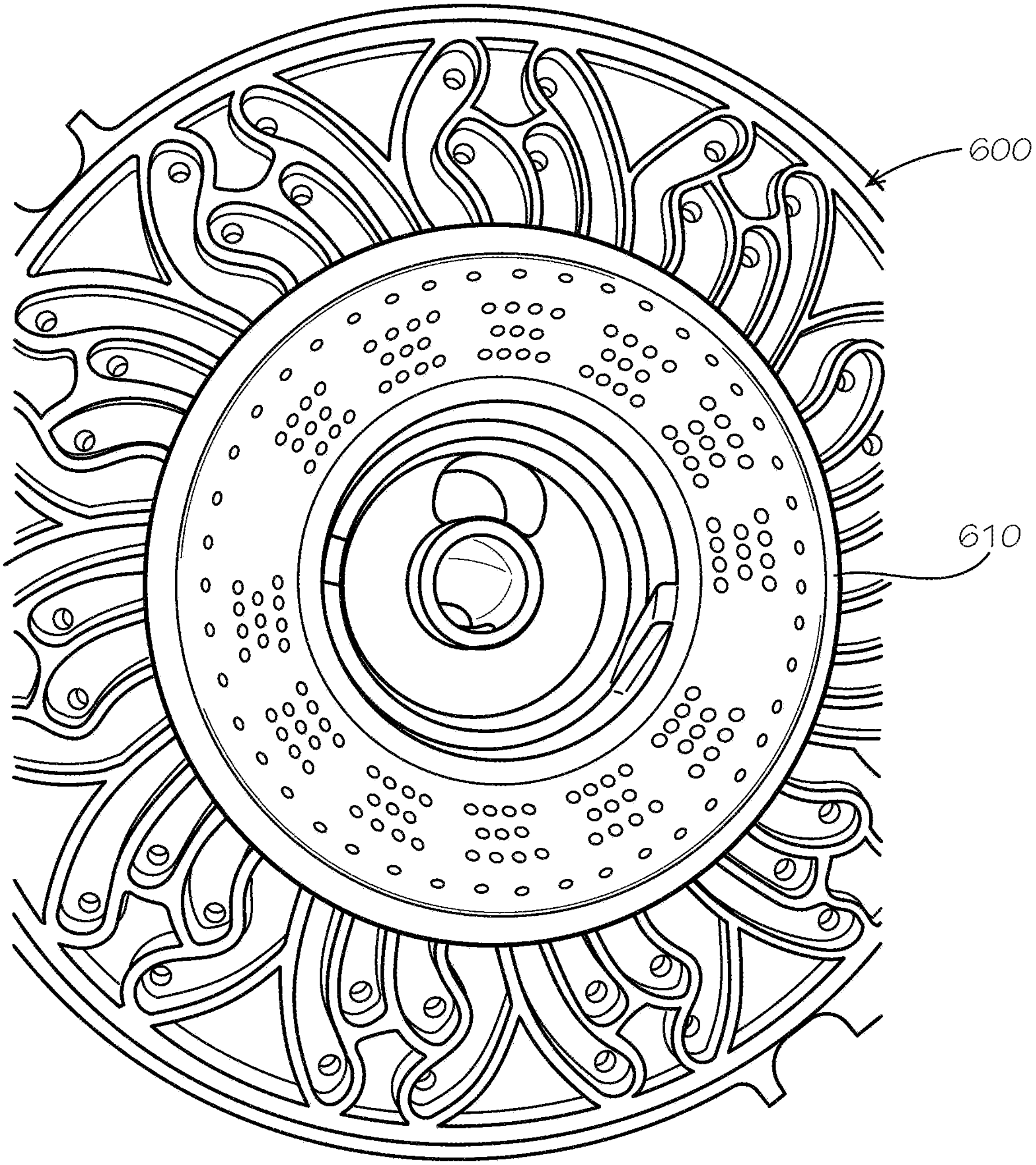
FIG. 18 is a partial bottom perspective view of an alternative embodiment of an upper injector ring of an injector ring assembly as may be described herein.
Figure 19:
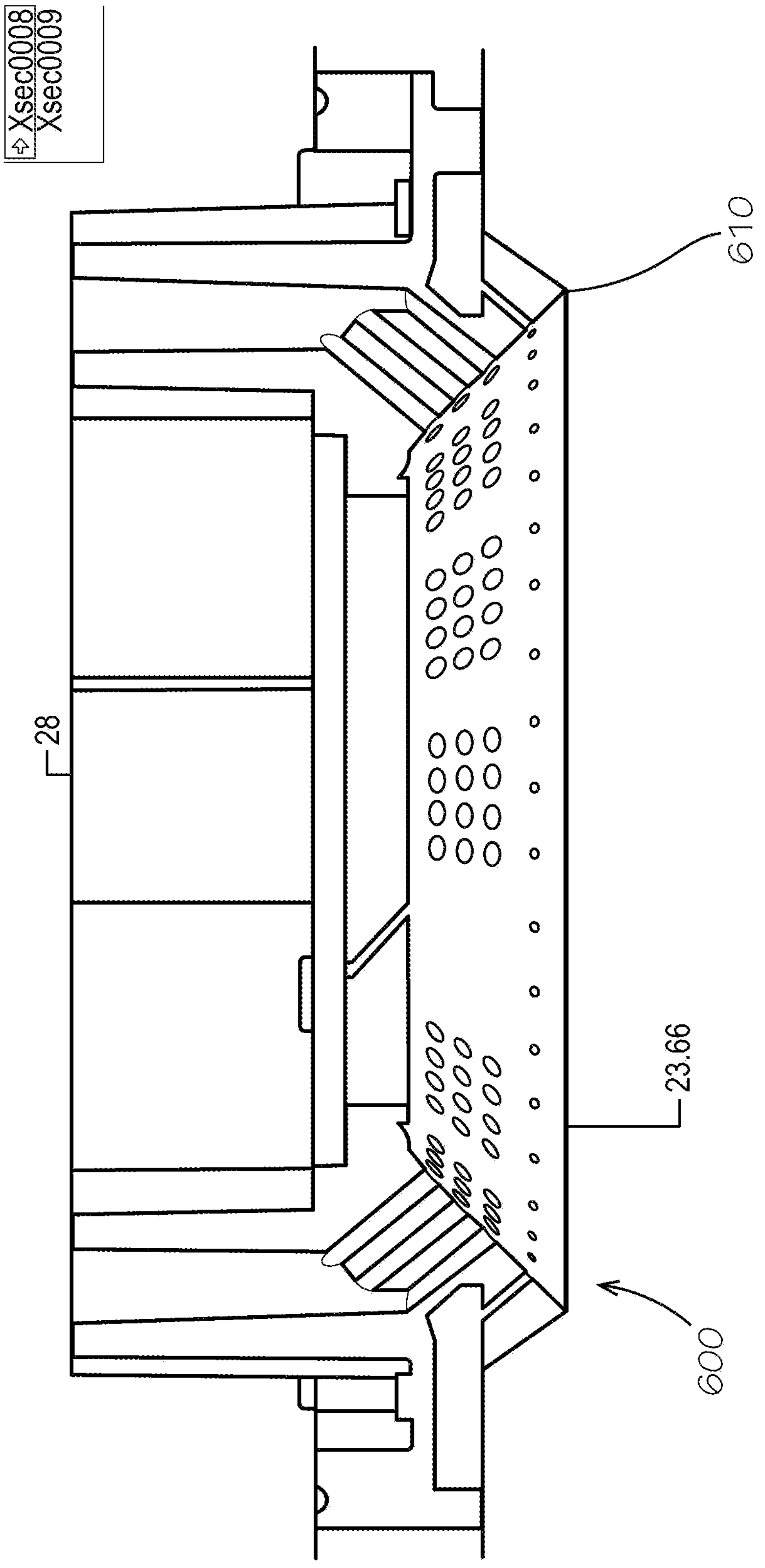
FIG. 19 is a side sectional view of the injector ring assembly of FIG. 18.

FIGS. 18 and 19 show an alternative embodiment of an upper injector ring 600 as may be described herein. In this example, the micro-ingredient dispensing chamber outlet tubes 330 and the macro-ingredient outlet tubes 230 may be in a "showerhead" configuration or a raised bowl 610. The micro-ingredient dispensing chamber outlet tubes 330 may be largely similar to those described above in number and configuration. Many more macro-ingredient outlet tubes 230, however, may be used herein. For example, if twelve groups of four macro-ingredient tubes 230 in a line configuration for a total of forty-eight macro-ingredient outlet tubes are shown in FIG. 4, twelve groups of eleven macro-ingredient outlet tubes 230 in a four by three by four configuration for a total of 132 macro-ingredient tubes 230 are shown herein. The increased number of macro-ingredient tubes 230 provides increased turbulence about the target assembly 160 for improved mixing and, hence, improved brix stratification. The number of macro-ingredient outlet tubes 230 may vary. Likewise, the size, shape, and configuration of the macro-ingredient outlet tubes 230 may vary. The macro-ingredient outlet tubes 230 may or may not include the threads 510 described above. Other components and other configurations may be used herein.

Figure 20:
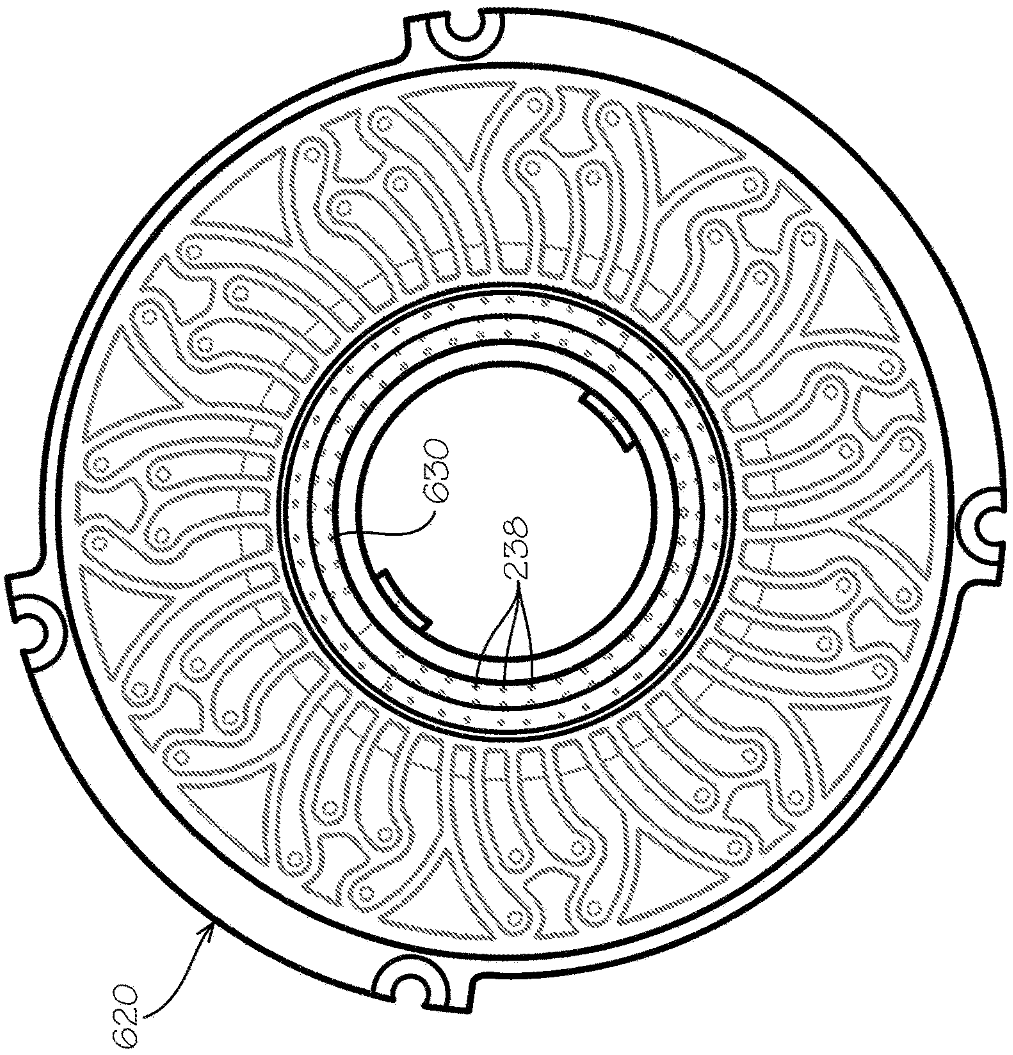
FIG. 20 is a partial bottom perspective view of an alternative embodiment of an upper injector ring of an injector ring assembly as may be described herein.
Figure 21:
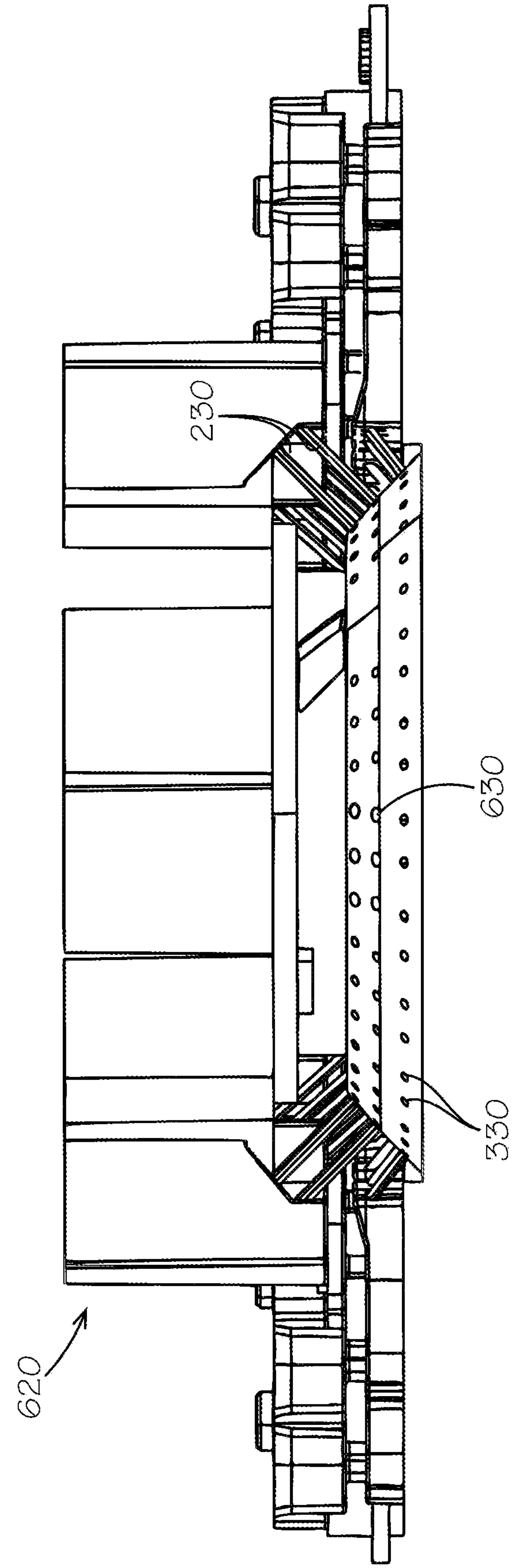
FIG. 21 is a side sectional view of the injector ring assembly of FIG. 20.

FIGS. 20-23B show an alternative embodiment of an upper injector ring 620 of a dispensing nozzle assembly 100 as may be described herein. In this example, the micro-ingredient dispensing chamber outlet tubes 330 and the macro-ingredient outlet tubes 230 may be positioned in or about the dispensing ring 340 instead of in the "showerhead" configuration or the raised bowl 610. Similar to that described above, the macro-ingredient outlet tubes 230 may be used in many different sizes, shapes, and configurations. FIGS. 20, 21, and 22A, show a number of the macro-ingredient outlet tubes 230 positioned in a number of two by three configurations 630 (two row of three macro-ingredient outlet tubes 230). FIG. 22B shows a number of the macro-ingredient outlet tubes 230 positioned in a two by four configuration 640 (two rows of four macro-ingredient tubes 230). FIG. 22C shows a number of the macro-ingredient outlet tubes 230 positioned in a four-two-four configuration 650 (a top row of four macro-ingredient tubes 230, a middle row of two macro-ingredient tubes 230, and a bottom row of four macro-ingredient tubes 230). FIG. 22D shows a single row of three macro-ingredient outlet tubes 230. Many other variations may be used herein. A number of different configurations may be used together herein in the upper injector ring 620. The macro-ingredients may be a conventional syrup stream.

In addition to variations in the number and the position of the macro-ingredient outlet tubes 230, the diameter of the macro-ingredient outlet tubes 230 also may vary. Although a typical diameter may be about 0.03 inches (about 0.76 millimeters), the diameter may vary from about 0.66 millimeters or less to about 1.2 millimeters or more. These variation may provide a maximum contact width along the target 160 of about 3 millimeter to about 8 millimeters or more with a total perimeter of all of the macro-ingredient outlet tubes 230 of about 22 millimeters to about 34 millimeters or more. Variations in the maximum contact width seem to be the most responsive in reducing overall Brix stratification. Other components and other configurations may be used herein. Macro-ingredient outlet tubes 230 of different diameter may be used together herein in the upper injector ring 620.

Another variable considered is the angle of the macro-ingredient outlet tubes 230 through the dispensing ring 230. A converging configuration of the macro-ingredient outlet tubes 230 may converging into a single channel 390 along the target 160 so as to mix with only one water stream from the diluent-sweetener dispensing ports 410. A parallel configuration 660 of the macro-ingredient outlet tubes 230 as is shown in FIG. 23A may intercept two or three water streams along two or three of the channels 390 of the target 160. A diverging configuration 670 of the macro-ingredient outlet tubes 230 as is shown in FIG. 23B may intercept three or more water streams along three or more channels 390. The extent of the diverging angle, however, may be limited to prevent or reduce overspraying. Better mixing thus may be provided by the macro-ingredients intercepting more of the water streams.

Many different variations of the macro-ingredient outlet tubes 230 may be used herein. By way of example only, preferred combinations may include the two by three configuration 630 or the two by four configuration 640 in the parallel configuration 660 or the diverging configuration 670 so as to maximize the overall width of contact with limited overspraying. Brix performance of 1.5 degrees or better may be obtained. These configurations may be combined with the inserts 460, the surface treatments 470, the treads 510, the twisted fins 530, the tapered fins 560, and other variations in any combination. The configurations shown herein are by way of example only. Any combination of number, size, angle, or position may be used herein. Other components and other configurations may be used herein.

Figure 24:
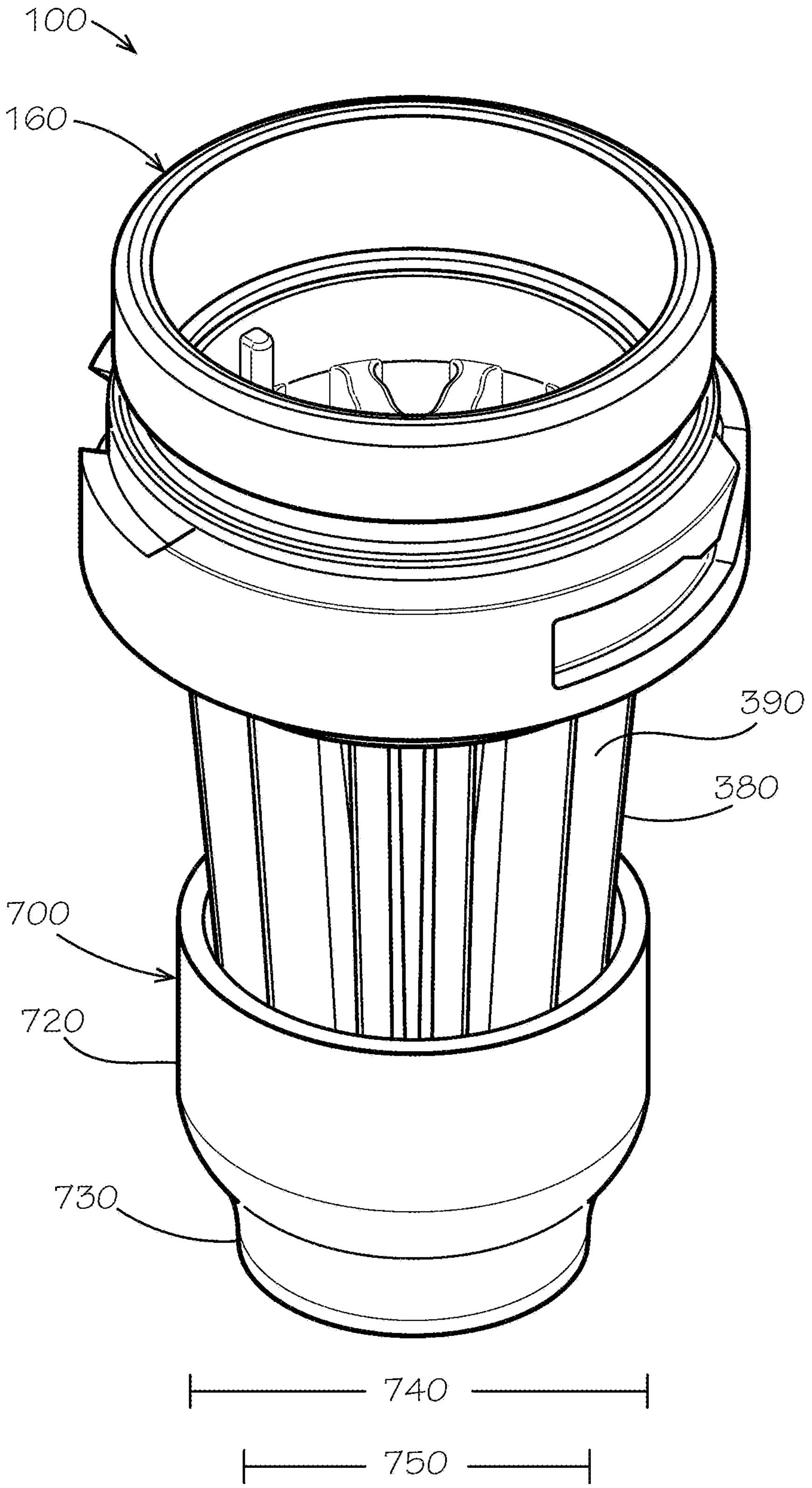
FIG. 24 is a perspective view of a target assembly with a static mixer as may be described herein.
Figure 25:
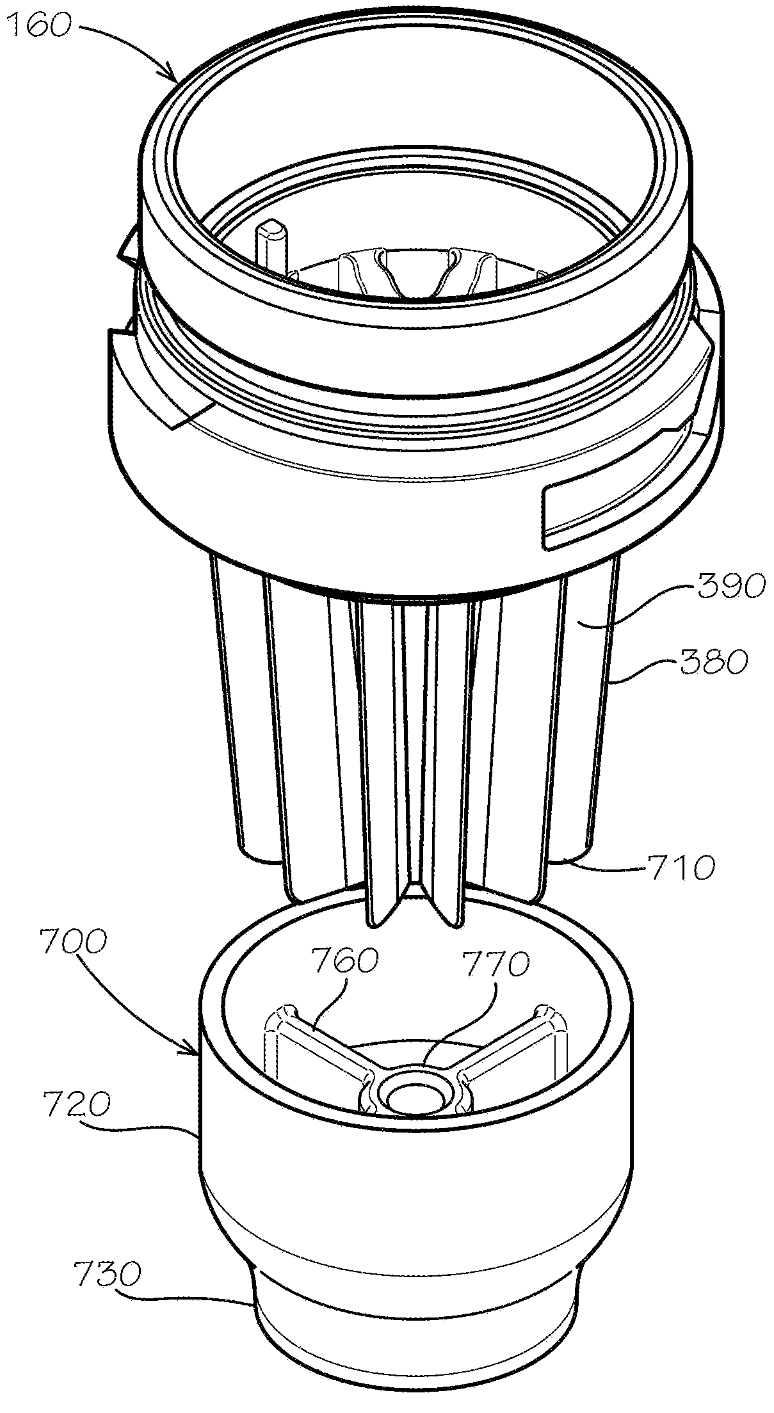
FIG. 25 is an exploded perspective view of the target assembly with a static mixer of FIG. 24.
Figure 26:
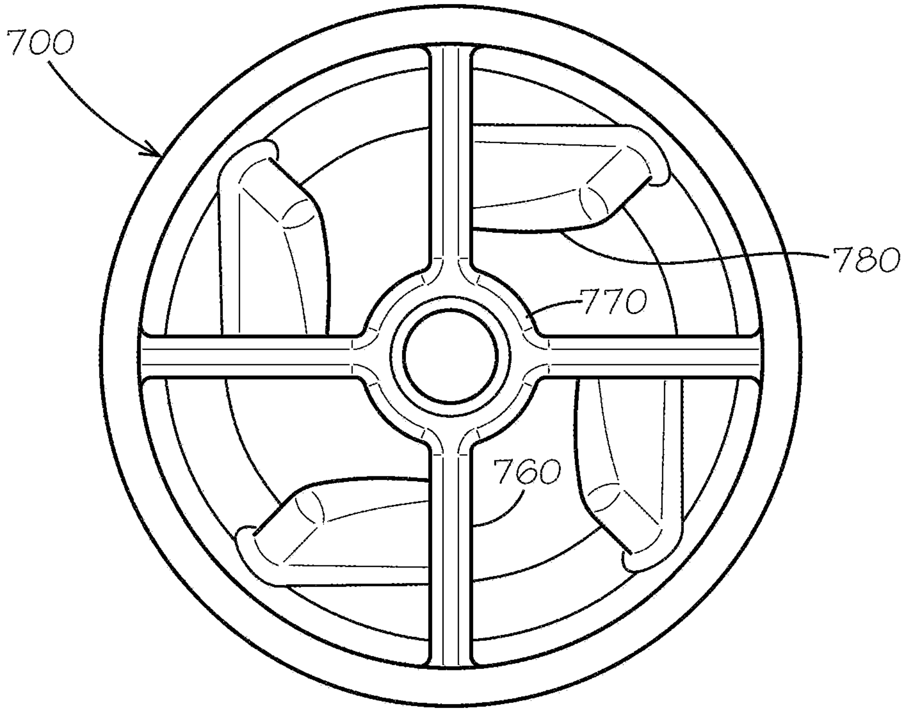
FIG. 26 is a top view of the static mixer of FIG. 24.

FIGS. 24 and 25 show a further embodiment of a portion of the dispensing nozzle assembly 100. In this example, the target assembly 160 includes a static mixer 700 positioned about a bottom tip 710 of the fins 380 thereof. The static mixer 700 may include an upper mixing tube portion 720 and a lower mixing tube portion 730. The upper mixing tube portion 720 may have a first diameter 740 sized to encircle the fins 380. The lower mixing tube portion 730 may extend beneath the fins 380 and may have a smaller second diameter 750. A number of baffles 760 may extend from a central hub 770. As is shown in FIG. 26, the static mixer 700 also may include a number of mixing fins 780 positioned therein in addition to or in place of the baffles 760. The size, shape, and configuration of the mixing fins 780 may vary. Other components and other configurations may be used herein.

The use of the static mixer 700 thus promotes good mixing of the fluids flowing therethrough. Traditionally, extended tubes and other types of static devices have been used to promote mixing therein. Tubes with an extended length, however, may have issues with the use of the micro-ingredients and the macro-ingredients because portions of the extended tube may not be washed consistently by the diluent. The use of the static mixer 700 herein with the upper mixing tube portion 720 and the lower mixing tube portion 730 with the reduced second diameter 750 thus may be preferred in that the diluent may flow about the outside thereof so as to promote cleaning and reduce carryover. The internal baffles 760 and the lower mixing tube portion 730 with the reduced second diameter 750 promote turbulence and, hence, good mixing while the upper mixing tube portion 720 maintains the swirling fluids therein so as to prevent a misdirected spray. The addition of the mixing fins 780 promotes further swirl and turbulence therein.

Figure 27:
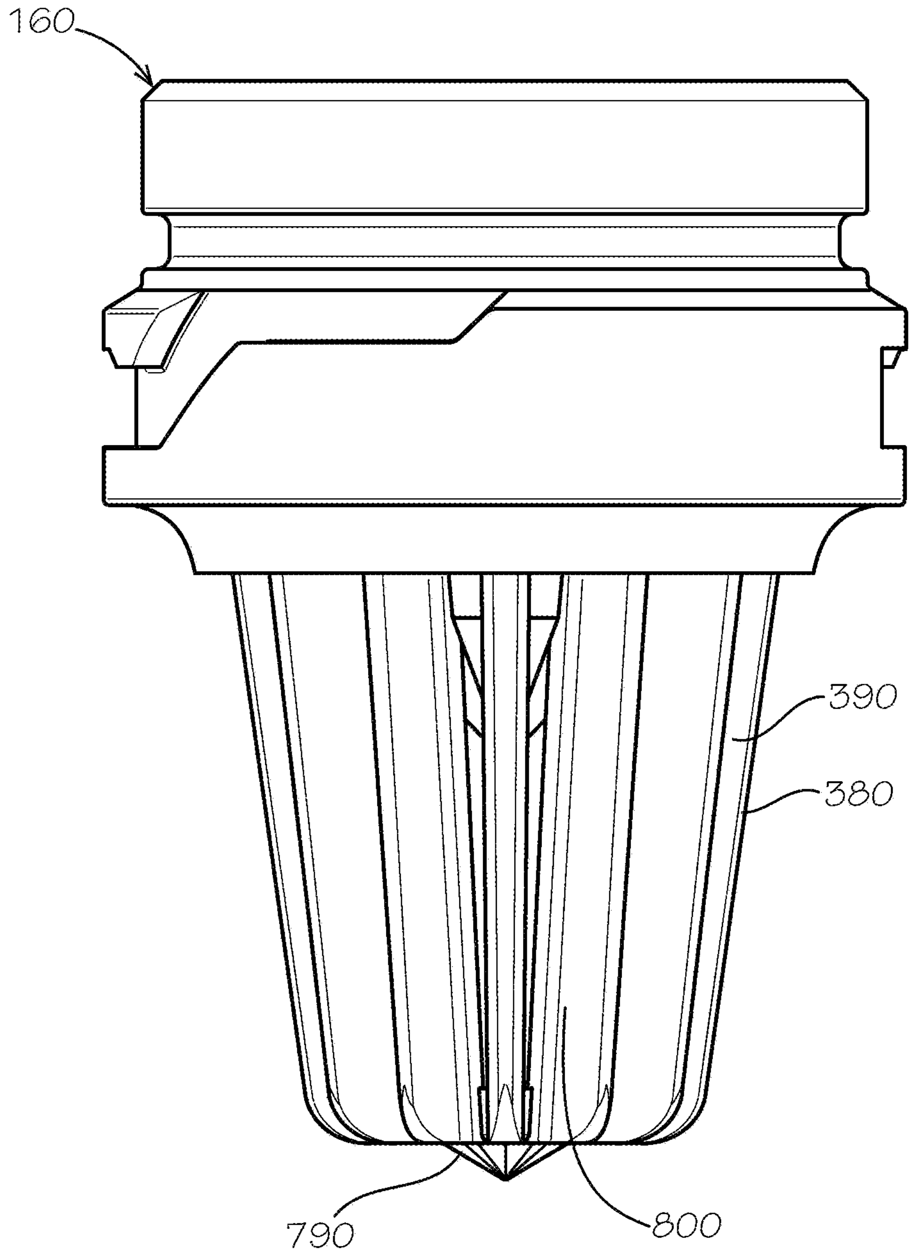
FIG. 27 is a side view of an alternative embodiment of a target assembly with a static mixer as may be described herein.
Figure 28:
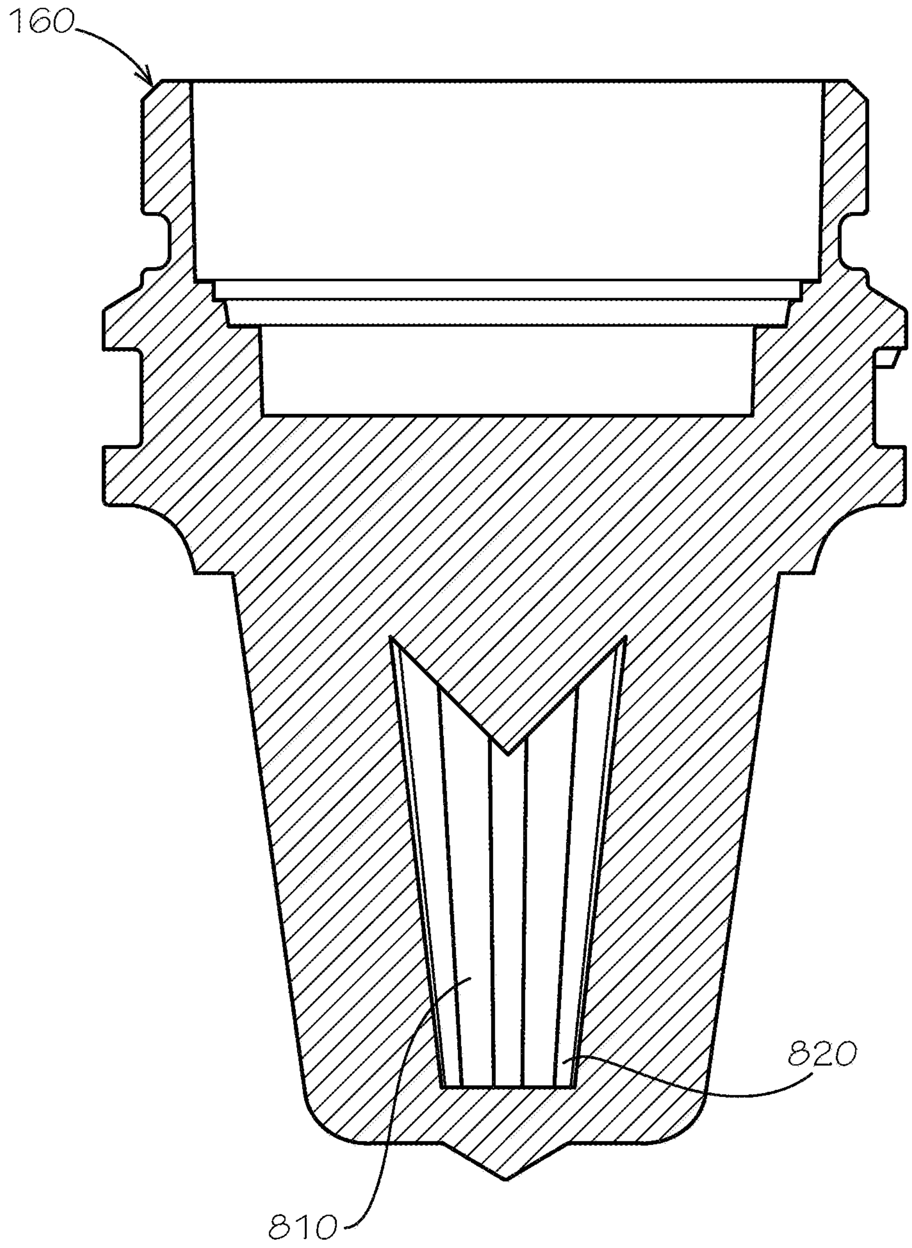
FIG. 28 is a section view of the target assembly of FIG. 27.

FIGS. 27 and 28 show further embodiments of the static mixer 700. As is shown in FIG. 27, the target assembly 160 may have an open center configuration 790. Specifically, the channels 390 between the fins 380 may have a slot 800 therein for fluid communication between the fins 380 so as to allow fluid to travel around the target assembly 160. Such horizontal movement may achieve more fluid coverage than the initial impingement. As is shown in FIG. 28, the target assembly 160 also may have a hollow core 810. The hollow core 810 may allow full mixing without regard to the coverage angle. The hollow core 810 may have a substantially conical shape 820 so as to limit areas of possible entrapment. The open center configuration 790 and the hollow core 810 may be used together or separately. Other components and other configurations may be used herein.

Figure 29:
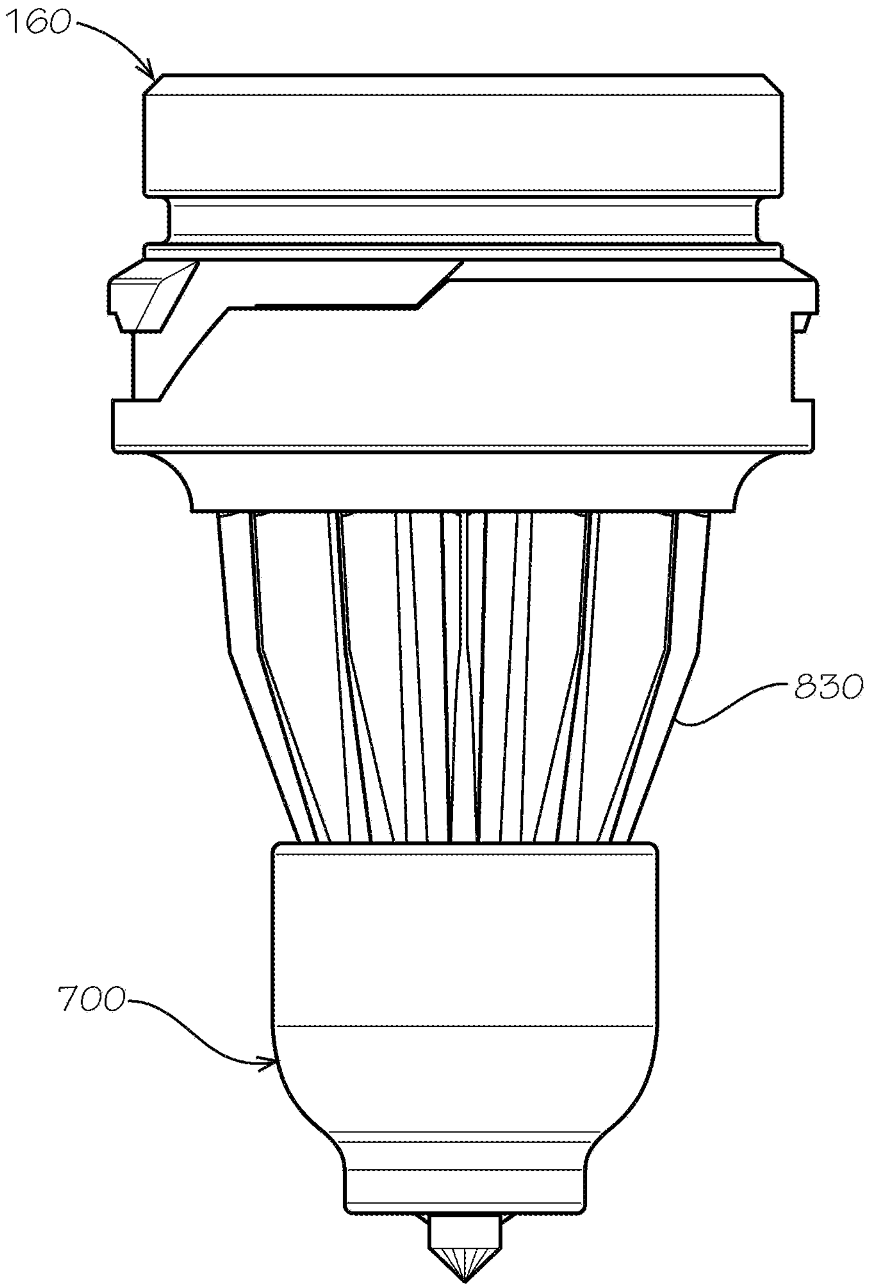
FIG. 29 is a perspective view of an alternative embodiment of a target assembly with a static mixer as may be described herein.

FIG. 29 shows a further embodiment of the static mixer 700. In this example, the fins 380 of the target assembly 160 may have a tapered configuration 830. As is shown, the tapered configuration 830 has a reduced diameter from the top to the bottom of the target assembly 160. The nature and extent of the tapered configuration 830 may vary. The minimized size and diameter of the tapered configuration 830 may provide reduced carryover between pours. Additional drip points/edges also may be used. The tapered configuration 830 also provides good cleaning of the static mixer 700 as the diluent flow over the front surface thereof. Other components and other configurations may be used herein.

Figure 30:
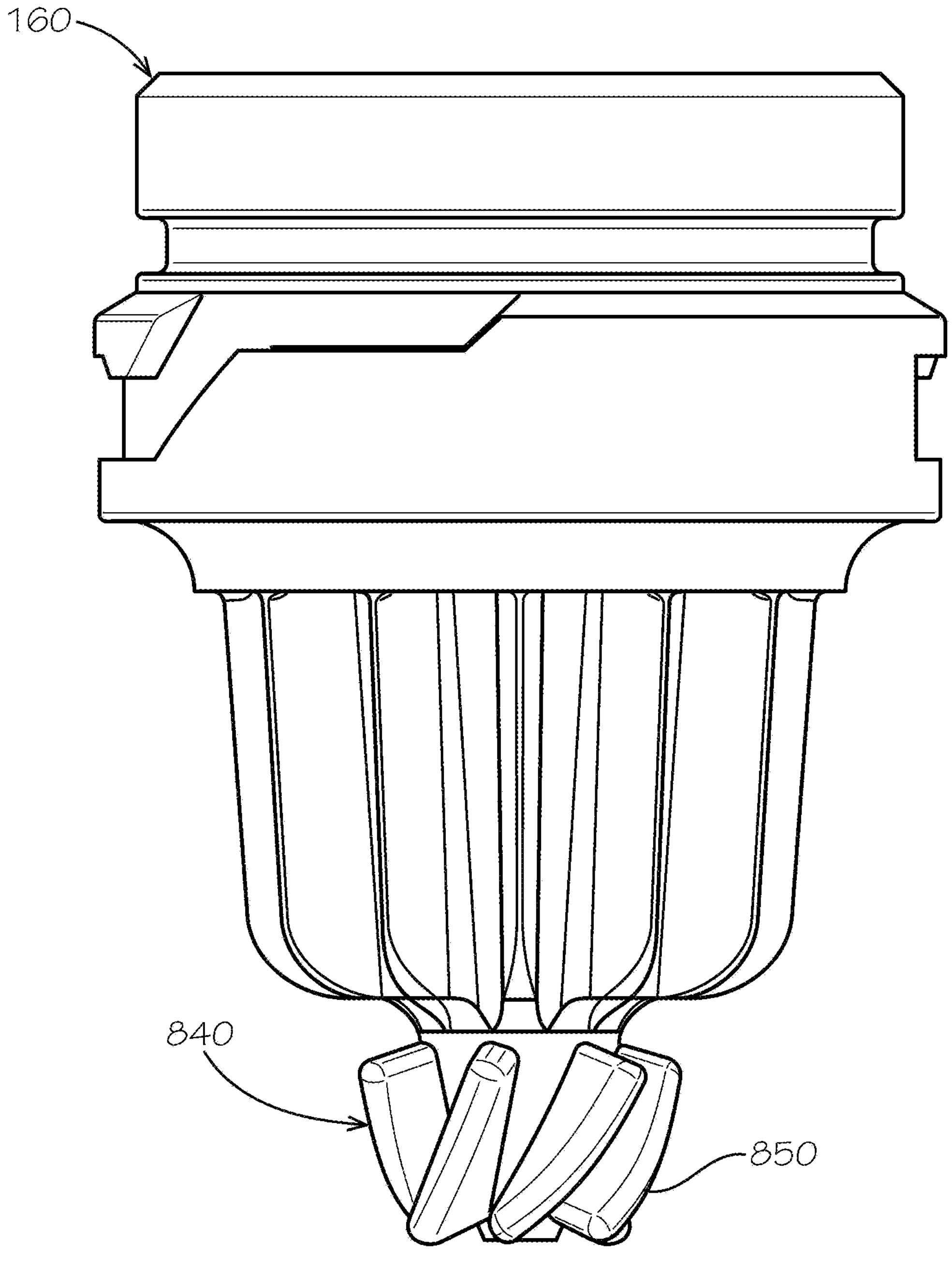
FIG. 30 is a side view of an alternative embodiment of a target assembly with a twisted static mixer as may be described herein.

FIG. 30 shows a target assembly 160 with a twisted static mixer 840 as may be described herein. In this example, the fins 380 and the channels 390 of the target assembly 160 may be somewhat shorter than those described above. The twisted static mixer 840 may be positioned beneath the tip 710 of the target assembly 160. The twisted static mixer 840 may include a number of twisted mixing fins 850. The twisted mixing fins 850 may have a reduced diameter as compared to the fins 380 of the target assembly 160. Any number of the twisted mixing fins 850 may be used in any size, shape, or configuration. The twisted mixing fins 850 may provide agitation so as to promote good mixing. The smaller diameter of the twisted mixing fins 850 may reduce centrifugal forces from spraying fluid away from the target assembly 160. Other components and other configurations may be used herein.

It should be apparent that the foregoing relates only to certain embodiments of the present application and the resultant patent. Numerous changes and modifications may be made herein by one of ordinary skill in the art without departing from the general spirit and scope of the invention as defined by the following claims and the equivalents thereof.

We claim:

1. A dispensing nozzle assembly for mixing a first fluid and a second fluid, comprising:

a target assembly;

the target assembly comprising a plurality of fins and a plurality of channels defined by adjacence of the plurality of fins;

the plurality of channels configured to receive a flow of the first fluid or the second fluid; and a static mixer positioned below the plurality of fins; wherein the static mixer comprises a plurality of twisted mixing fins;

wherein the plurality of fins comprises a first diameter, wherein the plurality of twisted mixing fins comprises a second diameter, and wherein the second diameter is less than the first diameter.

2. The dispensing nozzle assembly of claim 1, wherein the target assembly comprises a tip and wherein the static mixer is positioned below the tip.

3. The dispensing nozzle assembly of claim 1, wherein the target assembly comprises a plurality of slots in the plurality of channels.

4. The dispensing nozzle assembly of claim 1, wherein the target assembly comprises a hollow core.

5. The dispensing nozzle assembly of claim 1, wherein the target assembly comprises a plurality of slots in the plurality of channels and a hollow core.

6. The dispensing nozzle assembly of claim 5, wherein the hollow core comprises a conical shape.

7. The dispensing nozzle assembly of claim 1, wherein the target assembly comprises a tapered configuration.

8. The dispensing nozzle assembly of claim 1, wherein the plurality of twisted mixing fins are attached to a tip of the target assembly.

* * * * *